(12) United States Patent
Gervais et al.

(10) Patent No.: US 10,984,418 B2
(45) Date of Patent: Apr. 20, 2021

(54) AUTOMATED DEVICE FOR DATA TRANSFER

(71) Applicant: The Toronto-Dominion Bank, Toronto (CA)

(72) Inventors: Steven Gervais, Newmarket (CA); Sara Durning, Toronto (CA); Amanda Buchanan, Toronto (CA); Na-Hyun Sophie Park, Toronto (CA); Gregory James Hamilton, Toronto (CA); Miguel Martin C. Florendo, Toronto (CA); Gary Joseph Fernandes, Mississauga (CA); Nikolay Tzankov Markov, Toronto (CA); Bridget Lennon, Cherry Hill, NJ (US); Tristan Rodzen, Norway, ME (US); James Grimmer, Yardley, PA (US)

(73) Assignee: THE TORONTO-DOMINION BANK, Toronto (CA)

( * ) Notice: Subject to any disclaimer, the term of this patent is extended or adjusted under 35 U.S.C. 154(b) by 274 days.

(21) Appl. No.: 16/152,143

(22) Filed: Oct. 4, 2018

(65) Prior Publication Data
US 2020/0111098 A1    Apr. 9, 2020

(51) Int. Cl.
*G06Q 40/06* (2012.01)
*G06Q 20/40* (2012.01)
*G06Q 20/10* (2012.01)

(52) U.S. Cl.
CPC ..... *G06Q 20/4014* (2013.01); *G06Q 20/1085* (2013.01)

(58) Field of Classification Search
CPC ............... G06Q 40/00; G06Q 20/4014; G06Q 20/1085; G06Q 40/06
See application file for complete search history.

(56) References Cited

U.S. PATENT DOCUMENTS

| 5,297,252 A | 3/1994 | Becker |
|---|---|---|
| 6,012,048 A | 1/2000 | Gustin |

(Continued)

FOREIGN PATENT DOCUMENTS

JP    2005149473    6/2005

OTHER PUBLICATIONS

Antonella et al.; Introducing ATMs in India: a contexual inquiry; Nov. 3, 2003; Elsevier, web, 30-39 (Year: 2003).*

(Continued)

*Primary Examiner* — I Jung Liu
(74) *Attorney, Agent, or Firm* — Ridout & Maybee LLP

(57) ABSTRACT

Methods and systems for providing physical input at an automated device are described. An automated device provides a sequence of interfaces. The automated device communicates with a server to exchange data, which is used to dynamically populate one or more of the interfaces in the sequence. The interface sequences includes: a home interface providing options for performing an action using the automated device; a destination selection interface for selecting a destination account for a data transfer; a source selection interface for selecting a source account for the data transfer; a data value selection interface for receiving a data value for the data transfer; a data transfer processing interface indicating processing of the data transfer; an acknowledgement interface indicating completion of the data transfer; and a record preview interface providing a preview of a session record.

9 Claims, 20 Drawing Sheets

(56) References Cited

U.S. PATENT DOCUMENTS

| | | | |
|---|---|---|---|
| 6,966,034 | B2 | 11/2005 | Narin |
| 7,039,600 | B1 | 5/2006 | Meek et al. |
| 7,051,096 | B1 | 5/2006 | Krawiec et al. |
| 7,090,122 | B1 | 8/2006 | Warren et al. |
| 7,225,156 | B2 | 5/2007 | Fisher et al. |
| 7,229,007 | B1 | 6/2007 | Swaine |
| 7,570,646 | B2 | 8/2009 | Li et al. |
| 7,637,421 | B1 | 12/2009 | Trocme |
| 7,644,041 | B1 | 1/2010 | Schultz et al. |
| 7,657,473 | B1 | 2/2010 | Meffie |
| 7,753,772 | B1 | 7/2010 | Walker |
| 8,608,057 | B1 | 12/2013 | Crews et al. |
| 9,004,353 | B1 | 4/2015 | Black |
| 9,038,188 | B2 * | 5/2015 | Adams .................. G07F 7/1008 726/26 |
| 9,196,111 | B1 | 11/2015 | Newman et al. |
| 9,292,840 | B1 | 3/2016 | Velline et al. |
| 9,589,256 | B1 | 3/2017 | Thomas |
| 9,953,367 | B2 | 4/2018 | Del Vecchio et al. |
| 9,984,411 | B1 | 5/2018 | Velline et al. |
| 10,078,769 | B2 | 9/2018 | Bouteleux |
| 10,332,201 | B1 * | 6/2019 | Kunz ..................... G06Q 40/02 |
| 10,535,047 | B1 | 1/2020 | Thomas et al. |
| 2001/0014881 | A1 | 8/2001 | Drummond et al. |
| 2001/0044747 | A1 | 11/2001 | Ramachandran et al. |
| 2002/0196238 | A1 | 12/2002 | Tsukada et al. |
| 2003/0033249 | A1 | 2/2003 | Ingram et al. |
| 2003/0046234 | A1 | 3/2003 | Takadachi |
| 2003/0105710 | A1 * | 6/2003 | Barbara ................. G06Q 40/02 705/39 |
| 2003/0217005 | A1 | 11/2003 | Drummond et al. |
| 2004/0066374 | A1 | 4/2004 | Holloway et al. |
| 2004/0215566 | A1 | 10/2004 | Meurer |
| 2005/0035193 | A1 | 2/2005 | Gustin |
| 2005/0209958 | A1 | 9/2005 | Michelsen et al. |
| 2005/0233797 | A1 | 10/2005 | Gilmore et al. |
| 2006/0026114 | A1 | 2/2006 | Gregoire et al. |
| 2006/0038004 | A1 | 2/2006 | Rielly et al. |
| 2006/0139312 | A1 | 6/2006 | Sinclair et al. |
| 2006/0163341 | A1 | 7/2006 | Tulluri et al. |
| 2007/0181676 | A1 | 8/2007 | Mateen et al. |
| 2007/0215686 | A1 | 9/2007 | Matson |
| 2008/0040265 | A1 | 2/2008 | Rackley, III et al. |
| 2009/0108015 | A1 | 4/2009 | Kreamer |
| 2009/0212104 | A1 | 8/2009 | Smith et al. |
| 2010/0031021 | A1 | 2/2010 | Arnold et al. |
| 2010/0255885 | A1 | 10/2010 | Lee et al. |
| 2010/0325046 | A1 | 12/2010 | Milne |
| 2011/0022484 | A1 | 1/2011 | Smith et al. |
| 2011/0113328 | A1 | 5/2011 | Marzke |
| 2011/0184865 | A1 | 7/2011 | Mon et al. |
| 2011/0251956 | A1 | 10/2011 | Cantley et al. |
| 2011/0288997 | A1 | 11/2011 | McBride |
| 2012/0074217 | A1 | 3/2012 | Block et al. |
| 2012/0173348 | A1 | 7/2012 | Yoo |
| 2012/0197797 | A1 | 8/2012 | Grigg et al. |
| 2012/0286034 | A1 | 11/2012 | Smith |
| 2012/0330769 | A1 | 12/2012 | Arceo |
| 2013/0018787 | A1 * | 1/2013 | Andrews ................ G06Q 40/02 705/43 |
| 2013/0212015 | A1 | 8/2013 | Anthony et al. |
| 2013/0264384 | A1 | 10/2013 | Wadia |
| 2014/0331131 | A1 | 11/2014 | DeSellem |
| 2014/0331189 | A1 | 11/2014 | Lee |
| 2014/0372268 | A1 | 12/2014 | Hazam |
| 2015/0046794 | A1 | 2/2015 | Cardno |
| 2015/0066761 | A1 | 3/2015 | Chang |
| 2015/0149963 | A1 | 5/2015 | Chang et al. |
| 2015/0178730 | A1 | 6/2015 | Gleeson et al. |
| 2015/0186857 | A1 | 7/2015 | Swinfen |
| 2015/0199681 | A1 | 7/2015 | Salgado et al. |
| 2015/0212677 | A1 | 7/2015 | Dunne et al. |
| 2015/0262183 | A1 | 9/2015 | Gervais |
| 2015/0301722 | A1 | 10/2015 | Warnitz |
| 2016/0086145 | A1 | 3/2016 | Tsutsui |
| 2016/0098692 | A1 | 4/2016 | Johnson et al. |
| 2016/0098904 | A1 | 4/2016 | Choudhury et al. |
| 2016/0180304 | A1 | 6/2016 | Carriles |
| 2016/0364729 | A1 | 12/2016 | Ruparelia et al. |
| 2017/0003856 | A1 | 1/2017 | Mande et al. |
| 2017/0006013 | A1 | 1/2017 | Mande et al. |
| 2017/0006028 | A1 | 1/2017 | Tunnell et al. |
| 2017/0006114 | A1 | 1/2017 | Mande et al. |
| 2017/0039818 | A1 | 2/2017 | Lee |
| 2017/0091731 | A1 | 3/2017 | Nelson |
| 2017/0168691 | A1 | 6/2017 | Johansson |
| 2017/0352021 | A1 | 12/2017 | Szeto et al. |
| 2018/0039616 | A1 | 2/2018 | Shalit et al. |
| 2018/0096302 | A1 | 4/2018 | Tseretopoulos et al. |
| 2018/0114004 | A1 | 4/2018 | Hamid |
| 2018/0225659 | A1 | 8/2018 | Yamasaki et al. |
| 2018/0268414 | A1 * | 9/2018 | Chung .................. G06Q 20/206 |
| 2018/0268637 | A1 | 9/2018 | Kurian et al. |
| 2019/0012882 | A1 | 1/2019 | Poueriet |
| 2019/0073663 | A1 | 3/2019 | Jamkhedkar et al. |

OTHER PUBLICATIONS

Advisory Action; U.S. Appl. No. 16/152,074 dated Apr. 17, 2020.

Office Action; U.S. Appl. No. 16/152,066 dated Nov. 12, 2019.

Coconuts KL 2014 "Withdrawal systems: GST to be applied to ATM and banking services" 2014.

Lee, "ATM UI Prototyping/ Renovation", slideshare, drafted Jul. 6, 2011, uploaded Jul. 28, 2011 Jul. 28, 2011.

EMV Migration Forum, "Implementing EMV at the ATM: PIN Change at the ATM, Version 1.0", An EMV Migration Forum White Paper, Mar. 2015. 2015.

HowToBank, "How to ATM Change PIN", video on YOUTUBE, published on Feb. 27, 2014. 2014.

Kumar, "How to Transfer Money to Other Bank Account Through CDM (Cardless)", Accounting Education, published on Dec. 21, 2015. 2015.

TD Canada Trust, "Ways to Bank—Green Machine ATM—How to Transfer Between Acocunts", company website, accessed Aug. 18, 2014. 2014.

Scholl, "Bank of America ATM Deposit", video on YouTube, published Oct. 6, 2016. 2016.

Brouillette, "Making ADA Compliance a Priority", Advanced Kiosks, published May 15, 2018. 2018.

ShinyPress, Using a Bank Machine (ATM) to Make a Withdrawal, video on YouTube, published on Jul. 8, 2013. 2013.

Iucadp, "Concept of ATM", stock image on CANSTOCKPHOTO, published on Mar. 3, 2016. 2016.

Thunder Tech Pro, "How to Use ATM. Simple Video. Step by Step Full Procedure", video on YouTube, published on Apr. 22, 2017. 2017.

BhattiXpert, "How to Use ATM Machine HBL (2017))", video on YouTube, published on Dec. 29, 2016. 2016.

TD Bank, "Flow Do I Change My PIN Number", TD Bank website, employee Colleen B on Mount Laurel on Sep. 10, 2014. 2014.

SELCO Community Credit Union, "How to Deposit Checks in Our Upgraded ATMs", Feb. 7, 2013, YouTube Video—https://www.youtube.com/watch?v=MxfidDcRGi8. 2013.

Forward Bank, "Smart Deposit ATM Demo", Oct. 31, 2014, YouTube video—https://www.youtube.com/watch?v=aoHoD5Evot4. 2014.

NCR Corporation, "Intelligent ATM Machines: NCR Intelligent Check Deposit Video"—May 4, 2015, YouTube video—https://www.youtube.com/watch?v=2xT96BrVBXo. 2015.

Lego Bank, "How to Lodge Money in a Cash and Cheque Lodgement ATM", Feb. 8, 2015, YouTube video—https://www.youtube.com/watch?v=fvw0mhemUYs. 2015.

Scholl, "US Bank ATM Check Deposit", Mar. 30, 2015, YouTube video—https://youtube.com/watch?v=4oxq0tgwpL4. 2015.

Pinay Investor, "How to Check Transactions in BPI Express Online", Nov. 2, 2015, YouTube video—https://www.youtube.com/watch?v=KD2SWCs7nYA. 2015.

Rathaur, "How to Deposit Money in ATM", Mar. 23, 2016, YouTube video—https://youtube.com/watch?v=RQbjXtJVJ_o. 2016.

(56) References Cited

OTHER PUBLICATIONS

Scholl, "How Easay it is to Deposit Money into the Bank of America ATM", Oct. 1, 2016, YouTube video—https://www.youtube.com/watch?v=sRdyalenYZQ. 2016.

NCR Corporation (https://www.youtube.com/watch?v+1Wh7kZ70piQ), "Intelligent ATM Machines: NCR Intelligent Cash Deposit"—May 4, 2015. 2015.

Scholl, "How easy is it to Deposit money into the Bank of America ATM", https://www.youtube.com/watch?v=sRdyalenYZQ, Oct. 1, 2016. 2016.

Emirates NBD, "How to deposit Cheque into CDMs", https://www.youtube.com/watch?v=c4rhspQBKas, Aug. 30, 2016. 2016.

NCR Corporation, NCR SelfServ 80 Series ATM Family, https://www.youtube.com/watch?v=7MICCIn9RO0, Oct. 18, 2017. 2017.

NCR Corporation, "NCR Scalable Deposit Modile (SDM) Banking Software Video", https://www.youtube.com/watch?v=qQWKk3Rd-K8, Nov. 13, 2017. 2017.

Firstbankok, "FirstBank ATM Deposit", https://www.youtube.com/watch?v=594jnG4tgpE, Nov. 13, 2017. 2017.

Regions Bank, "Regions DepositSmart ATMs | Regions Bank", https://www.youtube.com/watch?v=2A0i25M9IW0, Sep. 26, 2017. 2017.

SewGenius, "How to do a check deposit on a Suntrust Bank ATM", https://www.youtube.com/watch?v=puxovvQkfYk, Aug. 27, 2017. 2017.

Office Action; U.S. Appl. No. 16/152,027 dated Jan. 22, 2020.
Office Action; U.S. Appl. No. 16/152,083 dated Jan. 30, 2020.
Office Action; U.S. Appl. No. 16/152,113; dated Jan. 2, 2020.
Office Action; U.S. Appl. No. 16/152,074 dated Oct. 2, 2019.

Isa Tala, Designing Haptic Clues for Touchscreen Kiosks, MS Thesis, University of Tampere, https://tampub.uta.fi/bitstream/handle/10024/99652/GRADU-1472825234.pdf?sequence=1&isAllowed=y 2016.

Leah Findlater and Joanna McGrenere, Beyond performance: Feature awareness in personalized interfaces, International Journal of Human-Computer Studies 68.3 (2010): 121-137, http://faculty.washington.edu/leahkf/pubs/IJHCS%20personalization%20author%20copy.pdf 2010.

Ahmed Farooq, Haptics in Kiosks and ATMs for the Disabled, University of Tampere, http://tampub.uta.fi/bitstream/handle/10024/81075/gradu03909.pdf;sequence=1 2009.

Office Action; U.S. Appl. No. 16/152,074 dated Feb. 10, 2020.
Office Action; U.S. Appl. No. 16/152,054 dated Apr. 6, 2020.
Office Action; U.S. Appl. No. 16/152,066 dated Apr. 8, 2020.
Final Rejection; U.S. Appl. No. 16/152,113 datd May 28, 2020.
Office Action; U.S. Appl. No. 16/392,905 dated Jun. 16, 2020.
Notice of Allowance; U.S. Appl. No. 16/152,066 dated Jul. 1, 2020.
Final Rejection, U.S. Appl. No. 16/152,083 dated Jul. 9, 2020.

J.D. Biersdorfer Q and A: Scanning Checks at the ATM; the new york times blog May 8, 2013.

Final Rejection; U.S. Appl. No. 16/152,027 dated Jul. 16, 2020.
Prasanna Zore, Things you can do with your ATM Card Feb. 21, 2007.

TheFinancialBrand, Wells Fargo's ATMs know you better Feb. 20, 2013.

Advisory Action; U.S. Appl. No. 16/152,083 dated Sep. 28, 2020.
Advisory Action; U.S. Appl. No. 16/152,027 dated Sep. 29, 2020.
Advisory Action; U.S. Appl. No. 16/152,113 dated Aug. 17, 2020.
Office Action; U.S. Appl. No. 16/152,074 dated Sep. 9, 2020.

Mengxing Zhang et al., A Survey on Human Computer Interaction Technology for Financial Terminals; pp. 174-177 2012.

Final Rejection; U.S. Appl. No. 16/392,905 dated Oct. 28, 2020.
Office Action; U.S. Appl. No. 16/152,113 dated Nov. 3, 2020.
Final Rejection; U.S. Appl. No. 16/152,054 dated Nov. 3, 2020.
Wikipedia—IP Fragmentation 2020.
Wikipedia—Packet Switching 2020.
LiveAction: What is a Network Packet? 2020.

\* cited by examiner

US 10,984,418 B2

AUTOMATED DEVICE FOR DATA TRANSFER

FIELD

The present disclosure is related to an automated device providing an interface enabling data transfer from a source account to a destination account.

BACKGROUND

An automated device may enable a user to perform a variety of actions related to a user account. The automated device may enable exchange of data with a backend server that manages the user account, in order to update, output information about, or otherwise perform an action related to the user account. The automated device may provide a sequence of interfaces to enable the user to perform a selected action related to the user account. For example, the automated device may be an automated teller machine (ATM), which may provide a sequence of interfaces to enable the user to perform an action related to the user's account at a service provider such as a financial institution.

User interaction with such an automated device may be time-consuming and frustrating for a number of reasons. For example, a user may find it time-consuming when there are a high number of inputs required to complete a desired action, or a user may find it frustrating when there is too much or too little information provided during the interaction. Further, interactions with the automated device can be challenging and prone to errors for certain users, particularly seniors, users with disabilities, users with language comprehension challenges, and users who are uncomfortable with technology. Accordingly, there is a need for methods, devices and systems related to user interactions with automated devices.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
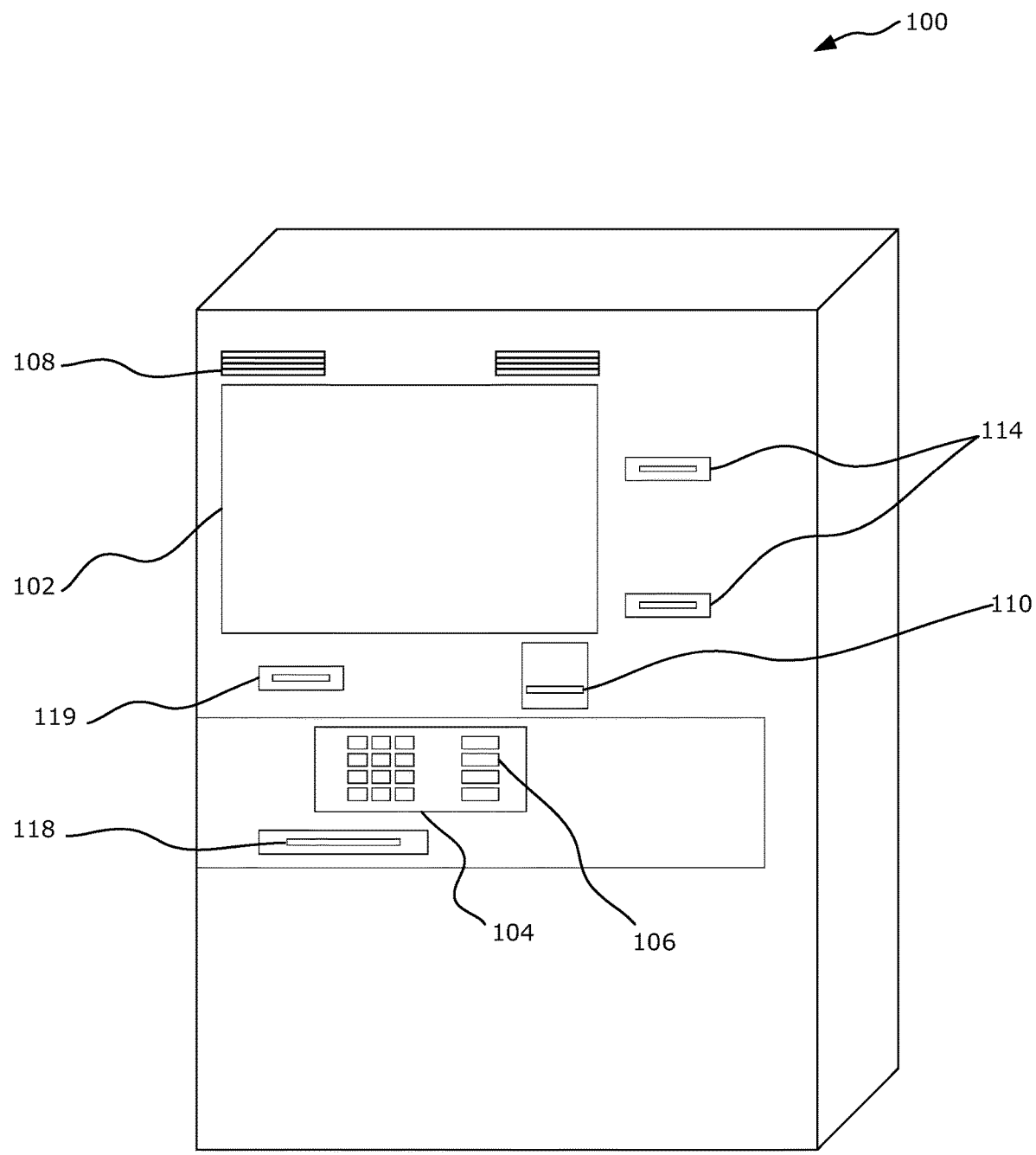
FIG. 1 is a schematic diagram of an example automated device, in accordance with example embodiments of the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Elements referred to in the singular may be implemented in the plural and vice versa, except where indicated otherwise either explicitly or inherently by context. The term "directly" is used herein to mean automatically and without intervening operations.

In accordance with one aspect of the present disclosure, there is provided an automated device. The automated device includes: a display screen; a communication module for communication with a first party server; a processor coupled to the display screen and to the communication module; and a memory coupled to the processor, the memory having machine-executable instructions stored thereon. The instructions, when executed by the processor, cause the automated device to, during a session: display, on the display screen, a home interface providing a plurality of selectable options for performing an action using the automated device; directly in response to selection of an option to initiate a data transfer, display, on the display screen, a destination selection interface providing a selectable option for selecting a destination account to receive the data transfer, the destination account being managed by a third-party service provider, the destination account being identified using information received via a first signal from the first party server; directly in response to selection of the destination account, display, on the display screen, a source selection interface providing a selectable option for selecting a source account for the data transfer; directly in response to selection of the source account, display, on the display screen, a data value selection interface for receiving a first input indicating a data value for the data transfer; directly in response to receipt of the first input indicating the data value, transmit a second signal to the first party server, via the communication module, the second signal including the data value and including information identifying the source account and the destination account; display, on the display screen, a data transfer processing interface providing output indicating processing of the data transfer; directly in response to receipt of a third signal from the first party server, via the communication module acknowledging the data transfer, display, on the display screen, an acknowledgement interface indicating completion of the data transfer, the acknowledgement interface further providing an option to end the session and an option to continue the session; and directly in response to selection of the option to end the session, display, on the display screen, a record preview interface, the record preview interface providing a preview of a record of the session, the record preview interface further providing an option to generate output of the record.

In accordance with another aspect of the present disclosure, there is provided a method at an automated device. The method includes: displaying a home interface providing a plurality of selectable options for performing an action using the automated device; directly in response to selection of an option to initiate a data transfer, displaying a destination selection interface providing a selectable option for selecting a destination account to receive the data transfer, the destination account being managed by a third-party service provider, the destination account being identified using information received via a first signal from a first party server that is in communication with the automated device; directly in response to selection of the destination account, displaying a source selection interface providing a selectable option for selecting a source account for the data transfer; directly in response to selection of the source account, displaying a data value selection interface for receiving a first input indicating a data value for the data transfer; directly in response to receipt of the first input indicating the data value, transmitting a second signal to the first party server, via a communication module of the automated device, the second signal including the data value and including information identifying the source account and the destination account; displaying a data transfer processing interface providing output indicating processing of the data transfer; directly in response to receipt of a third signal from the first party server, via the communication module acknowledging the data transfer, displaying an acknowledgement interface indicating completion of the data transfer, the acknowledgement interface further providing an option to end the session and an option to continue the session; and directly in response to selection of the option to end the session, displaying a record preview interface, the record preview interface providing a preview of a record of the session, the record preview interface further providing an option to generate output of the record.

In accordance with another aspect of the present disclosure, there is provided a non-transitory machine-readable medium having tangibly stored thereon executable instructions for execution by a processor of an automated device. The instructions, when executed by the processor, cause the automated device to, during a session: display, on a display screen of the automated device, a home interface providing a plurality of selectable options for performing an action using the automated device; directly in response to selection of an option to initiate a data transfer, display, on the display screen, a destination selection interface providing a selectable option for selecting a destination account to receive the data transfer, the destination account being managed by a third-party service provider, the destination account being identified using information received via a first signal from a first party server that is in communication with the automated device; directly in response to selection of the destination account, display, on the display screen, a source selection interface providing a selectable option for selecting a source account for the data transfer; directly in response to selection of the source account, display, on the display screen, a data value selection interface for receiving a first input indicating a data value for the data transfer; directly in response to receipt of the first input indicating the data value, transmit a second signal to the first party server, via a communication module of the automated device, the second signal including the data value and including information identifying the source account and the destination account; display, on the display screen, a data transfer processing interface providing output indicating processing of the data transfer; directly in response to receipt of a third signal from the first party server, via the communication module acknowledging the data transfer, display, on the display screen, an acknowledgement interface indicating completion of the data transfer, the acknowledgement interface further providing an option to end the session and an option to continue the session; and directly in response to selection of the option to end the session, display, on the display screen, a record preview interface, the record preview interface providing a preview of a record of the session, the record preview interface further providing an option to generate output of the record.

In any of the above, the option to generate output of the record may include an option to transmit the output of the record to an email address linked to the account, wherein a fourth signal may be received from the first party server, via the communication module, the fourth signal including the email address, and wherein the option to transmit the output of the record to the email address may include a preview of the email address.

Any of the above may include steps or instructions to: directly in response to selection of an option on the record preview interface, display, on the display screen, a goodbye interface, the goodbye interface providing non-sensitive customer appreciation information specific to the account.

In any of the above, the destination selection interface, source selection interface and data value selection interface may each include a respective context indicator indicating that the destination selection interface, source selection interface and data value selection interface each is provided in the context of the data transfer.

In any of the above, the context indicator of the source selection interface may further indicate the destination account for the data transfer, and wherein the context indicator of the data value selection interface may further indicate the destination account and the source account for the data transfer.

Any of the above may include steps or instructions to: extract information from an access card inserted into the automated device; transmit a fifth signal to the first party server, via the communication module, the fifth signal including the information extracted from the access card; in response to receipt of a sixth signal from the first party server, via the communication module, the sixth signal providing information identifying at least the source account associated with the access card, display, on the display screen, a welcome interface, the welcome interface providing at least some of the plurality of selectable options for performing an action using the automated device; directly in response to selection of one of the selectable options provided by the welcome interface, display, on the display screen, an authentication interface for receiving an authentication code for the source account; transmit a seventh signal to the first party server, via the communication module, the seventh signal including a second input received via the authentication interface; display, on the display screen, an authentication waiting interface providing output indicating processing of the second input; and in response to receipt of an eighth signal from the first party server, via the communication module, that the second input is validated for the source account, proceed to display of the home interface.

In any of the above, at least one of the home interface and the source selection interface may provide an option to display a current status of the source account.

In any of the above, the destination selection interface may provide an option to display information about a historical data transfer to the destination account.

In any of the above, the data value selection interface may provide an option to select a predetermined data value for the data transfer, the predetermined data value being a historical data value of a historical data transfer to the destination account.

Any of the above may include steps or instructions to: directly in response to selection, on the acknowledgement interface, of the option to continue the session, display, on the display screen, the home interface.

Figure 2:
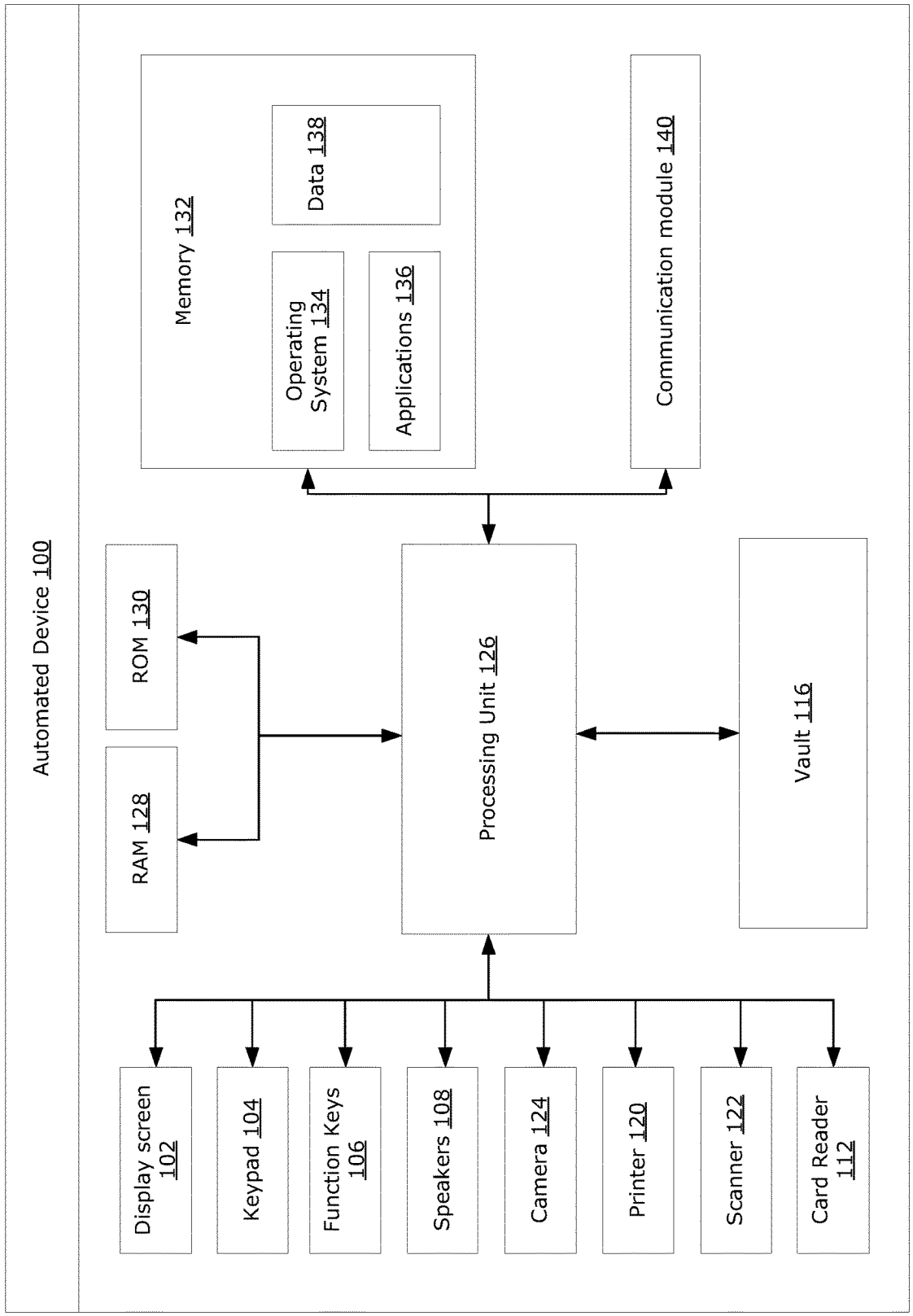
FIG. 2 is a block diagram showing some internal components of the automated device of FIG. 1.

FIGS. 1 and 2 show an example automated device 100 that may be used to implement example embodiments of the present disclosure. The automated device 100 includes one or more input and/or output (I/O) devices that facilitate interaction between the user and the automated device 100. As shown, a display screen 102 is provided which may be a touchscreen or non-touchscreen display. When the display screen 102 is a touchscreen display, the display screen 102 may serve as both an input device as well as an output device. A graphical user interface (GUI) may be displayed on the display screen 102 to enable any suitable textual and/or graphical output/input.

The example automated device 100 includes a keypad 104 which may be used to provide input to the automated device 100, for example to enter an authentication code (e.g., personal identification number (PIN)) and/or to provide numerical/non-numerical inputs. The keypad 104 may include keys for confirming/cancelling a particular action, and/or navigating through the interface provided by the automated device 100. In some examples, the keypad 104 may include function keys 106 that may be used for specific input (e.g., "Accept", "Cancel"), in addition to multi-function or alphanumeric input keys. In some embodiments, the keypad 104 may be equipped with braille (or other forms of tactile indicators) to improve accessibility for visually impaired users. The automated device 100 may include audio input/output devices, such as a microphone (not shown) for receiving audio user input and, as shown, one or more speakers 108 for providing audio output. Other examples of I/O devices may include, for example, a mouse, an optical reader, and/or a stylus (or other input device(s)) through which a user of the automated device 100 may provide input.

An access card may be received, through a card slot 110, into the automated device 100 to be read by a card reader 112. In some examples, the card reader 112 reads a magnetic strip on the back of the access card to extract information stored thereon. Information may be stored in an integrated circuit (IC) chip embedded within the access card in addition to, or instead of, the magnetic strip, which may be read by the card reader 112. The information read by the card reader 112 may be used to perform functions such as card authentication, card holder validation, and/or account information retrieval.

User interactions with the automated device 100 may include insertion of physical input (e.g., cash and/or check, or other physical representations of data) through one or more input slots 114. The automated device 100 may incorporate sensors (e.g., an optical scanner 122) and/or a digital image processor (not shown) to process the received physical input. Physical output, such as cash, may be extracted from a vault 116 inside the automated device 100 and dispensed to the user through an output slot 118. Another output slot 119 may be used to provide a physical record, such as a paper receipt, of the user's interactions with the automated device 100 during a session. A session on the automated device 100 may be defined to include the inputs, outputs provided on the automated device 100 from the start of user interaction with the automated device 100 (e.g., starting with insertion of an access card into the card slot 110) and ending when the user chooses to end interactions with the automated device 100 (e.g., user provides input to the automated device 100 indicating that all desired actions have completed and/or user logs out). The physical record may be generated by a printer 120 inside the automated device 100. Additionally, or alternatively, a record of the session may be emailed to the user. The automated device 100 may include a camera 124, which may be used to record video (e.g., for security purposes) and/or to facilitate interaction between the user and a local or remote agent.

Internally, the automated device 100 includes a processing unit 126 for controlling overall operation of the automated device 100. The processing unit 126 may be operably coupled to one or more of random access memory (RAM) 128, read-only memory (ROM) 130, memory 132, and input/output (I/O) devices such as those described above. Machine-executable instructions may be stored within memory 132 and/or other storage to provide instructions to the processing unit 126 for enabling the automated device 100 to perform various functions. For example, the memory 132 may store instructions for implementing an operating system 134, and one or more application programs 136. The memory 132 may also store data 138 locally. Additionally, or alternatively, some or all of the machine-executable instructions for the automated device 100 may be embodied in hardware or firmware (not shown). In this example, the automated device 100 further includes a communication module 140, for wired and/or wireless communication with other network devices (see FIG. 3, for example).

Figure 3:
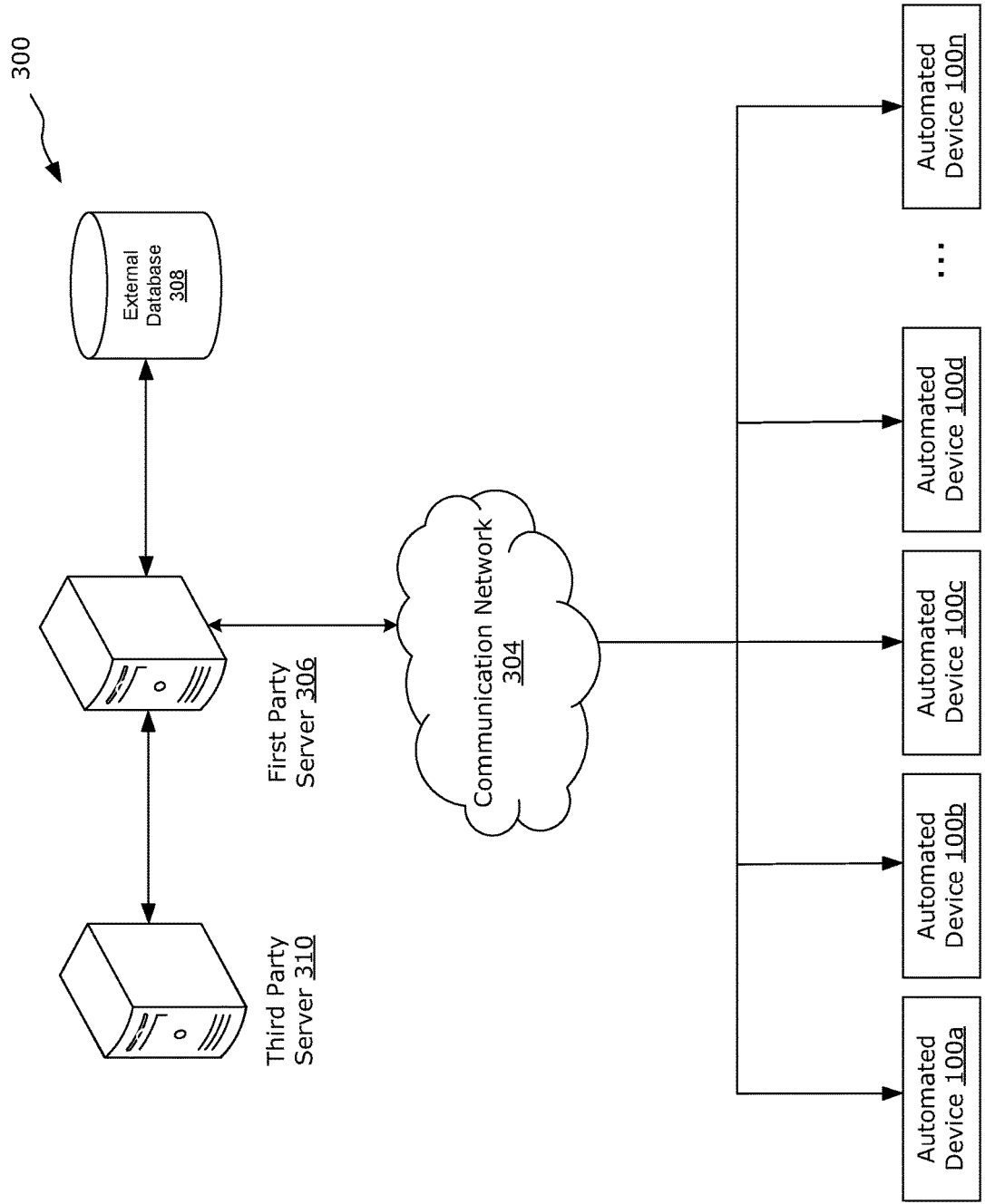
FIG. 3 is a schematic diagram of an example network environment in which example embodiments of the present disclosure may be implemented.

FIG. 3 shows an example network 300 in which the example automated device 100 may be implemented. In this example, a plurality of automated devices 100a-100n may be connected through a communication network 304 to a first party server 306 via any suitable communications links, such as network links, wireless links, hard-wired links, and the like. Each of the automated devices 100a-100n may be an instance of the automated device 100 of FIG. 1, or other suitable automated device. The automated devices 100a-100n may be the same or different from each other.

The communication network 304 may include any one or more suitable computer networks including, for example, the Internet, an intranet, a wide-area network (WAN), a wireless WAN (WWAN), a local-area network (LAN), a wireless LAN (WLAN), a wireless network, a digital subscriber line (DSL) network, a frame relay network, an asynchronous transfer mode network, a virtual private network (VPN), a public-switched telephone network (PSTN), or a public-land mobile network (PLMN), or any combination of any of the same. Network communications may be facilitated through the use of any suitable communication such as TCP/IP, Ethernet, FTP, HTTP, HTTPS, and the like. The communication network 304 may be, or may include, an interbank network (which may also be referred to as an ATM consortium or ATM network).

The first party server 306 may be a backend server associated with the same service provider as the automated devices 100a-100n. The first party server 306 may be operable to communicate signals and exchange data with each of the plurality of automated devices 100a-100n. The first party server 306 in this example network 300 is also coupled to a database 308 that may store data accessible by the first party server 306. The data stored by the database 308 comprises user account information and provisioning data for data transfers in corresponding records. The database 308 is located externally to and remote from the automated devices 100. The first party server 306 in this example network 300 is also coupled to a third-party server 310, which may provide third-party services, such as authentication services, or may be associated with another service provider (e.g., another financial institution). The first party server 306 may be coupled to the database 308 and/or the third-party server 310 via one or more networks (not shown). It is to be appreciated that although one instance each of the first party server 306, database 308, third-party server 310 and communication network 304 are shown, any of the components in FIG. 3 may be present in any number.

The first party server 306 includes a controller, including at least one processor which controls the overall operation of the first party server 306. The processor is coupled to a plurality of components via a communication bus which provides a communication path between the components and the processor. The processor is coupled to a communication module that communicates with corresponding communication modules of the automated devices 100 and the third-party server 310 by sending and receiving corresponding signals. The first party server 306 may include, or may communicate with, a data transfer server (not shown) which generates data transfer instructions via an instruction generation module, sends and/or receives data transfer instructions between various endpoints (e.g., the automated devices 100, the first party server 306, the third-party server 310, etc.) and which may process data transfer instructions via an instruction processing module.

The implementation of the methods described herein include a sequence of interfaces, also referred to as user interfaces or graphical user interfaces (GUIs), to be provided by the automated device, as discussed below. One or more interfaces in the interface sequence may provide one or more selectable options as discussed below, each selectable option being selectable, for example by interacting with a touchscreen and/or a keypad 104 of the automated device 100. The selection options are provided in onscreen buttons or other user interface elements. The selectable options, when selected via corresponding interaction, cause different interfaces to be displayed which may, in some instances, involve communications between the automated device 100 and the first party server 306 to obtain information to dynamically populate interfaces in the interface sequence. The methods described herein may be implemented during a session with the automated device 100, for example as a portion of the session. The methods described herein may be implemented together to provide a sequence of interfaces.

Figure 4:
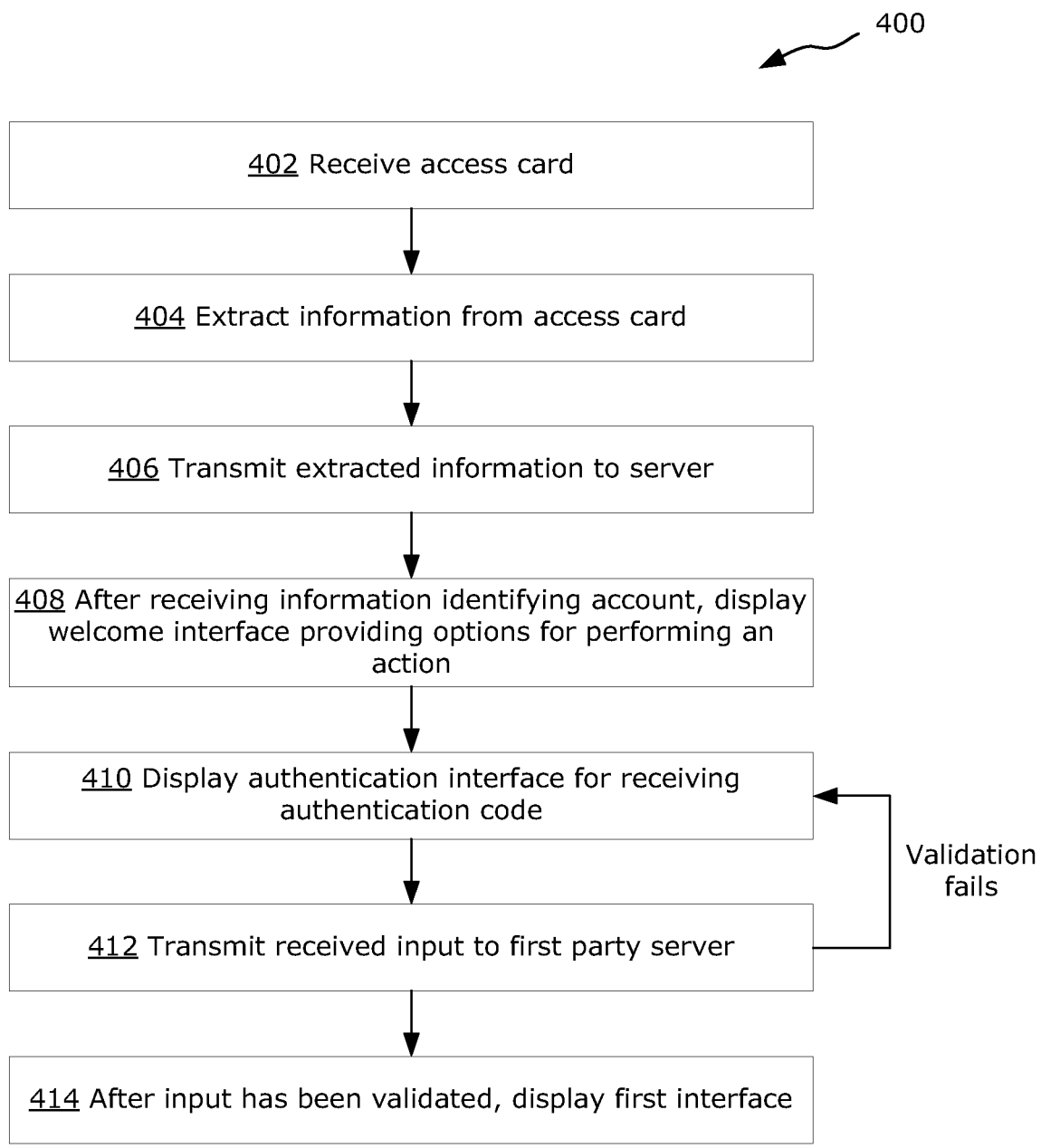
FIG. 4 is a flowchart illustrating an example method for initiating a session at an automated device.

FIG. 4 is a flowchart of an example method 400 for initiating a session on an automated device. The method 400 may be performed by the automated device 100 illustrated in FIG. 1, for example. For convenience, reference will be made to the automated device 100 illustrated in FIG. 1 although automated devices having different features may be used in other embodiments. The session is initiated to perform one or more actions using the automated device. In the present disclosure, the session is initiated to perform a data transfer using the automated device. A data transfer may involve transfer of data from a source account to a destination account. The source account may be managed by a first party service provider that also manages the automated device, whereas the destination account may be a third-party account managed by a third-party service provider. In particular, a data transfer may involve transferring a data value from the source account to the destination account, which may include updating the source account to deduct (or debit) the data value and updating the destination account to add (or credit) the data value. Data transfer information, also referred to as provisioning data, may specify how to send and/or receive data transfers, including data transfer signals and other communications and any messages contained therein. The data transfers may include messages.

The data transfers, when comprising financial transactions, may comprise remittances in which case the data transfer information may comprise remittance data for the third-party service provider. The remittances may be bill payments, bill payment instructions or electronic funds transfer instructions, in which case the data transfer information may comprise biller remittance data. Completion of a data transfer may involve reconciliation of accounts between respective backend servers of the first party service provider and the third-party service provider.

At 402, an access card is received by the automated device (e.g., via a card slot on the automated device).

At 404, the access card is processed by the automated device (e.g., using a card reader) to extract information stored on the access card. The information extracted from the access card may include information used to identify whether the access card is associated with an account that is managed by the first party service provider (e.g., financial institution) that owns or manages the automated device.

At 406, the automated device transmits the information extracted from the access card to a backend server, for example a first party server owned or managed by the first party service provider that owns the automated device, to identify and/or retrieve information about one or more associated accounts. Where the first party server determines that the access card is not associated with an account that is managed by the first party service provider, the first party server may further communicate a service provider network to obtain account information from another service provider.

The first party server transmits to the automated device a signal providing information identifying the account(s) associated with the access card. The information provided by the first party server may include information indicating whether the access card is associated with an account that is managed by another service provider, for example.

Figure 7:
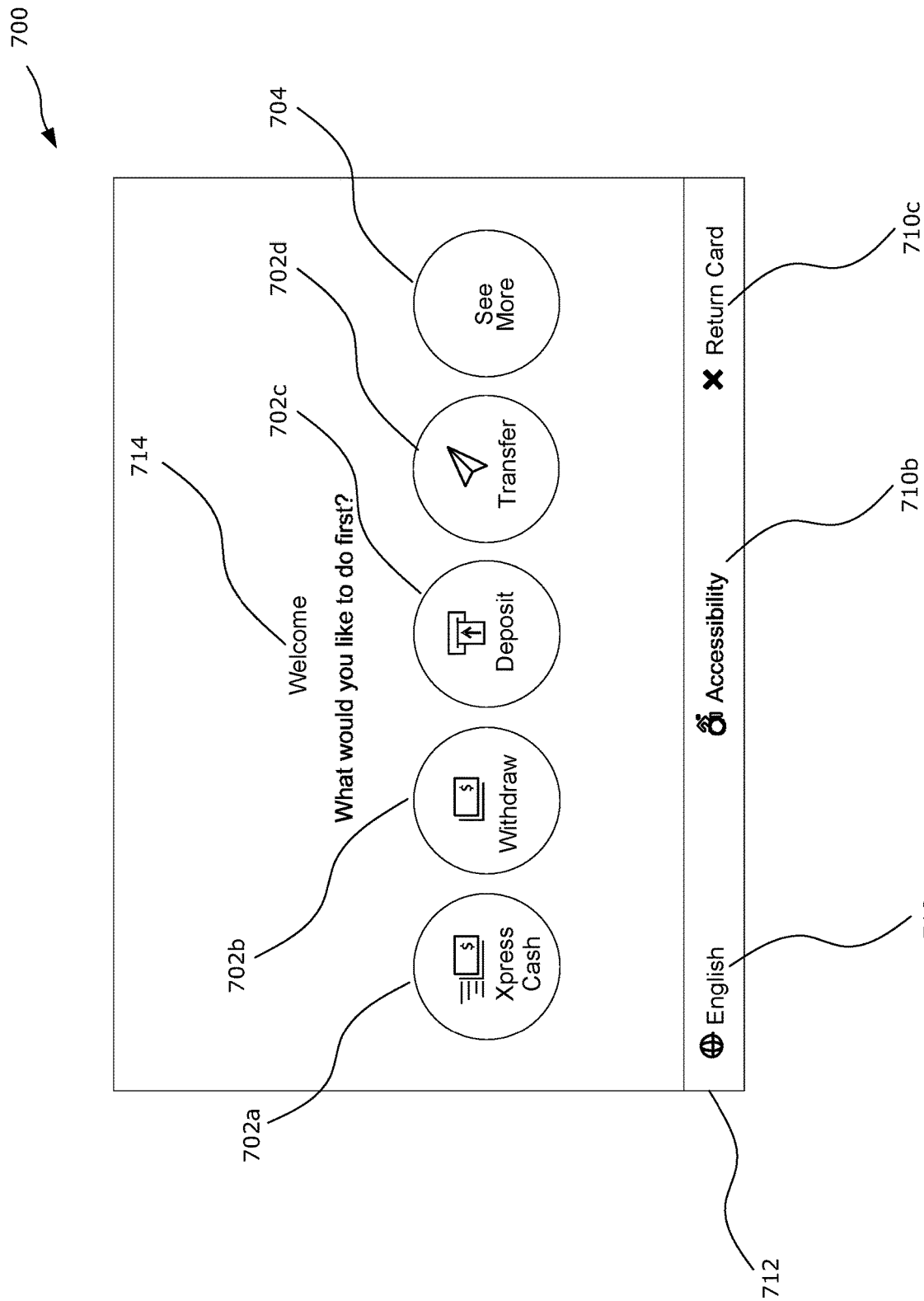
FIG. 7 is an example welcome interface.

At 408, in response to receipt of the information from the first party server, the automated device displays, the interface 700 shown in FIG. 7 (also referred to as a welcome interface).

As shown in FIG. 7, the interface 700 includes a plurality of selectable options 702a-702d (generally referred to as options 702), which may be selected to initiate an action using the automated device. The options 702 displayed at the interface 700 may be a subset of all available actions that may be performed using the automated device. In some examples, the options 702 displayed at the interface 700 may depend on the capabilities of the automated device and/or the actions that are permissible for the account(s) (e.g., as determined based on the inserted access card). For example, if the account is not managed by the first party service provider, the options 702 may be more limited than if the account is managed by the first party service provider that owns the automated device. The provided options 702 may depend on the capabilities of the automated device, for example whether the automated device is able to provide certain types of output (e.g., cash or foreign currency). The options 702 may also be dynamically modified based on the current state of the automated device. For example, the automated device may normally be capable of providing a certain type of output (e.g., cash) but may be in a current state in which that capability is not available (e.g., the automated device has run out of cash).

In FIG. 7, the displayed selectable options 702 include an option 702a for providing express physical output (e.g., express withdrawal of cash), an option 702b for providing physical output (e.g., regular withdrawal of cash), an option 702c for providing physical input (e.g., deposit of cash and/or check), and an option 702d for performing a data transfer between first party accounts. The interface 700 also provides an option 704 for displaying more available actions.

The interface 700 in this example also includes selectable general options 710a-710c (generally referred to as general options 710). The general options 710 may include options concerning general operation of the automated device and may not be related to any specific action or workflow performed using the automated device. As shown, the general options 710 are provided in a lower portion 712 of the user interface 700, for example, in a bar, panel or frame at or near the bottom of the welcome interface 700. The general options 710 in this example include an option 710a for returning to a previous interface in the sequence of interfaces, an option 710b for displaying accessibility options, and an option 710c to cancel the current action (in this case, the exchange of data using physical input). The option 710a is displayed on the left side of the lower portion 712, the option 710b is displayed at the middle of the lower portion 712, and the option 710c is displayed on the right side of the lower portion 712. Other locations for the general options 710 may be used. The general options 710 may each be provided at the same location over a plurality of interfaces during the session, which may help a user to more easily find each of the general options 710. In particular, the location of the option 710b may enable a user with limited mobility and/or limited reach to more easily select the option 710b for displaying accessibility options.

The user interface 700 may also include a greeting 714. In some examples, the greeting 714 may include non-sensitive customized information, such as a name associated with the account. Such customized information may be obtained via communication between the automated device and the first party server. For example, such information may be provided to the automated device together with identification of the account(s) associated with the access card.

Figure 8:
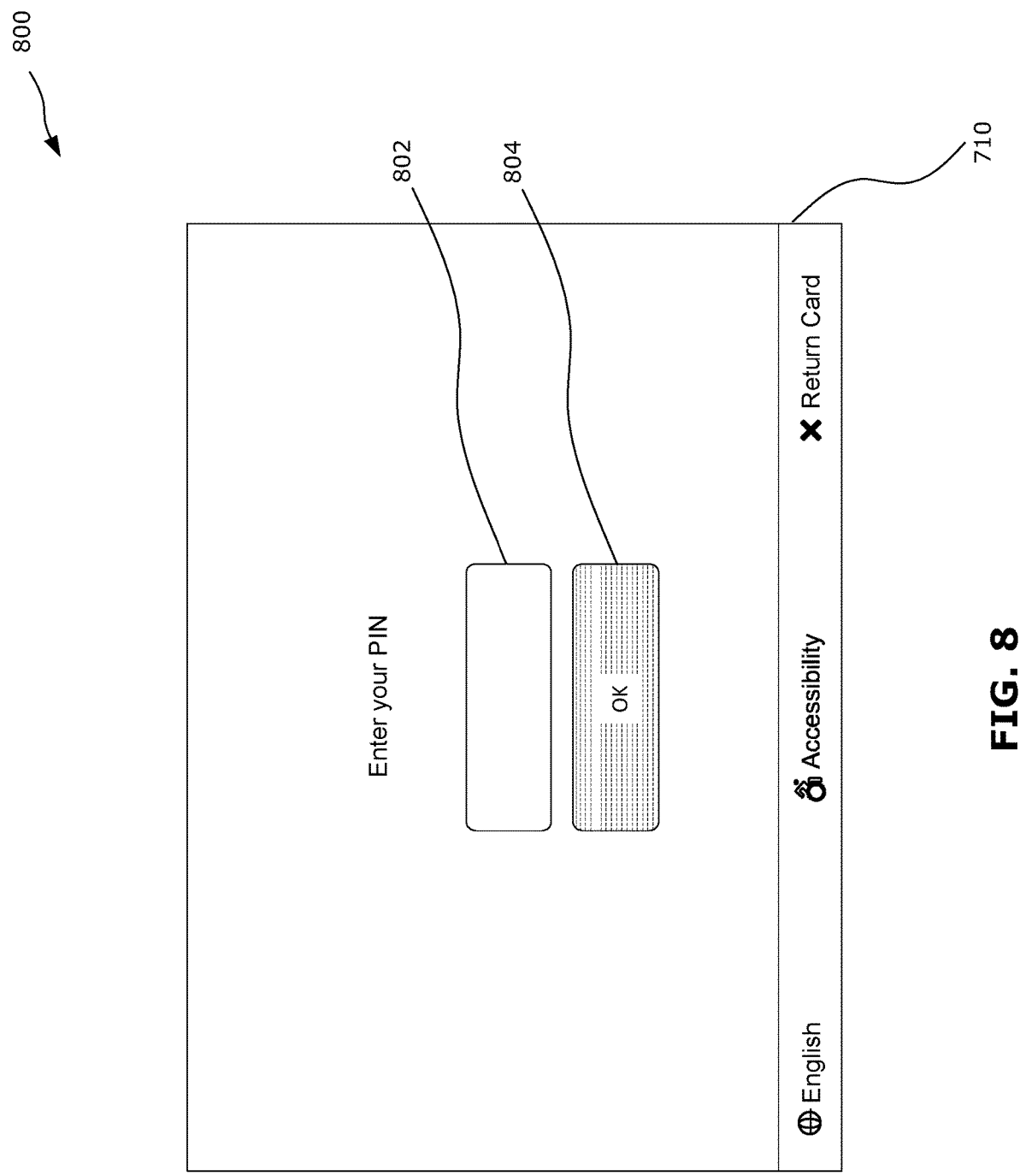
FIG. 8 is an example authentication interface.

At 410, directly in response to selection of one of the options 702, 704, the automated device proceeds to display of the interface 800 of FIG. 8 (also referred to as an authentication interface). The interface 800 enables receipt of input of an authentication code associated with the account. The interface 800 may also be referred to as an authentication code entry screen or PIN entry screen.

The interface 800 provides a field 802 for entry of an authentication code (e.g., PIN) associated with the account (e.g., as identified via the inserted access card). Where there are multiple accounts associated with the access card, the same authentication code may be used for all the accounts. In this sense, the authentication code may also be considered to be an authentication code that has been set for the access card. For example, a user may use the keypad of the automated device to provide input into the field 802. The keypad may also provide the ability to backspace or cancel input. Other input mechanisms may also be used. The interface 800 provides a confirmation button 804 to confirm entry of the authentication code. The interface 800 also provides the general options 710 as discussed above. When the confirmation button 804 is selected, the input into the field 802 is received by the automated device. In some examples, instead of selecting the confirmation button 804, the user may use a physical button (e.g., a physical confirmation button or "OK" button, which may be part of the keypad) to confirm entry of the authentication code. Input using a physical confirmation button may be interpreted to be selection of the confirmation button 804. It should be generally understood that, in the present disclosure, selection of any confirmation button may be alternatively input using a physical confirmation button, such as an "OK" button on the keypad.

At 412, the automated device transmits the received input to the first party server. The first party server performs validation, for example by comparing the received input to an authentication code associated with the account. If the validation is successful (i.e., the received input matches the authentication code associated with the account), the first party server transmits a signal to the automated device to indicate that validation is successful. If the validation is not successful (i.e., the received input does not match the authentication code associated with the account), the first party server transmits a signal to the automated device to indicate that validation failed.

If validation failed, the automated device may generate output (e.g., a visual display) to indicate that the received input does not match the authentication code associated with the account. The automated device may again present the interface 800 to re-enter the authentication code.

Figure 9:
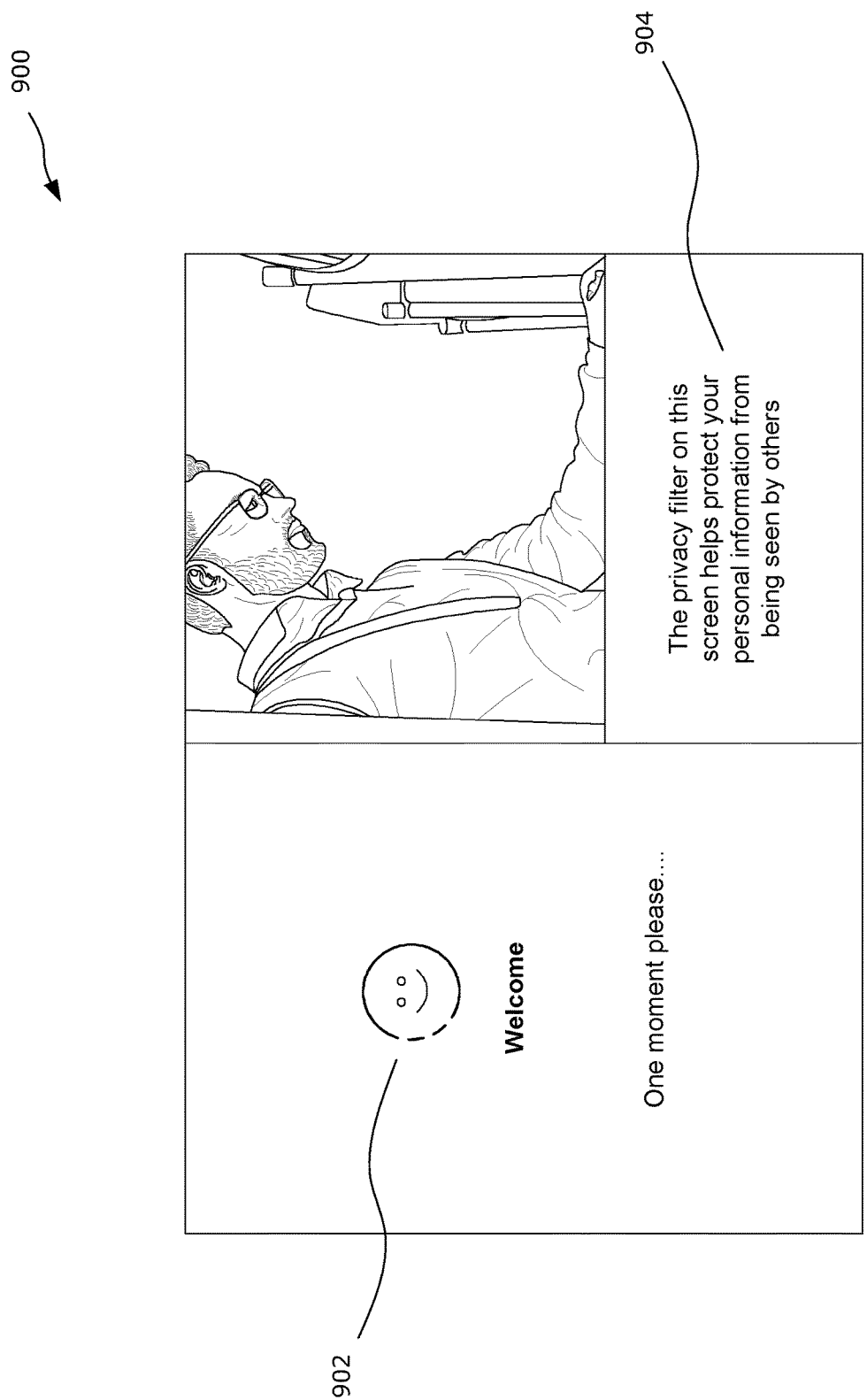
FIG. 9 is an example authentication waiting interface.

The automated device may display the user interface 900 of FIG. 9 (also referred to as an authentication waiting interface) after receiving the input via the interface 800 and before the signal is received from the first party server. The interface 900 may also be referred to as a processing screen or a wait screen.

The user interface 900 in this example includes an animation 902 to indicate processing. Other indicators, with or without animation, may be used. The user interface 900 in this example also displays information 904. The displayed information 904 may or may not be related to the current action being performed, may or may not be specific to the account, and may or may not be specific to the service provider.

The information 904 may be used to inform the user of features and options provided by the automated device and/or service provider associated with the automated device. This may enable new features/options, useful features/options or rarely used features/options to be brought to the user's attention. The information 904 may also provide general user appreciation information, marketing information, or other customized or non-customized information. In some examples, the information 904 may provide customized information, for example customer appreciation information associated with the account, or marketing information customized to the account. Such customized information may be dynamically generated, based on account information provided by the server. In some examples, the information 904 may include dynamic information (e.g., time of day, current temperature, etc.) which may be updated by the automated device or may be provided to the automated device by the first party server. The interface 900 may be omitted in other embodiments in which the processing or waiting time is negligible.

At 414, in response to receipt a signal from the first party server that the input received at 410 is validated, the automated device may proceed to display of the interface 1000 of FIG. 10A, discussed further below.

Figure 5:
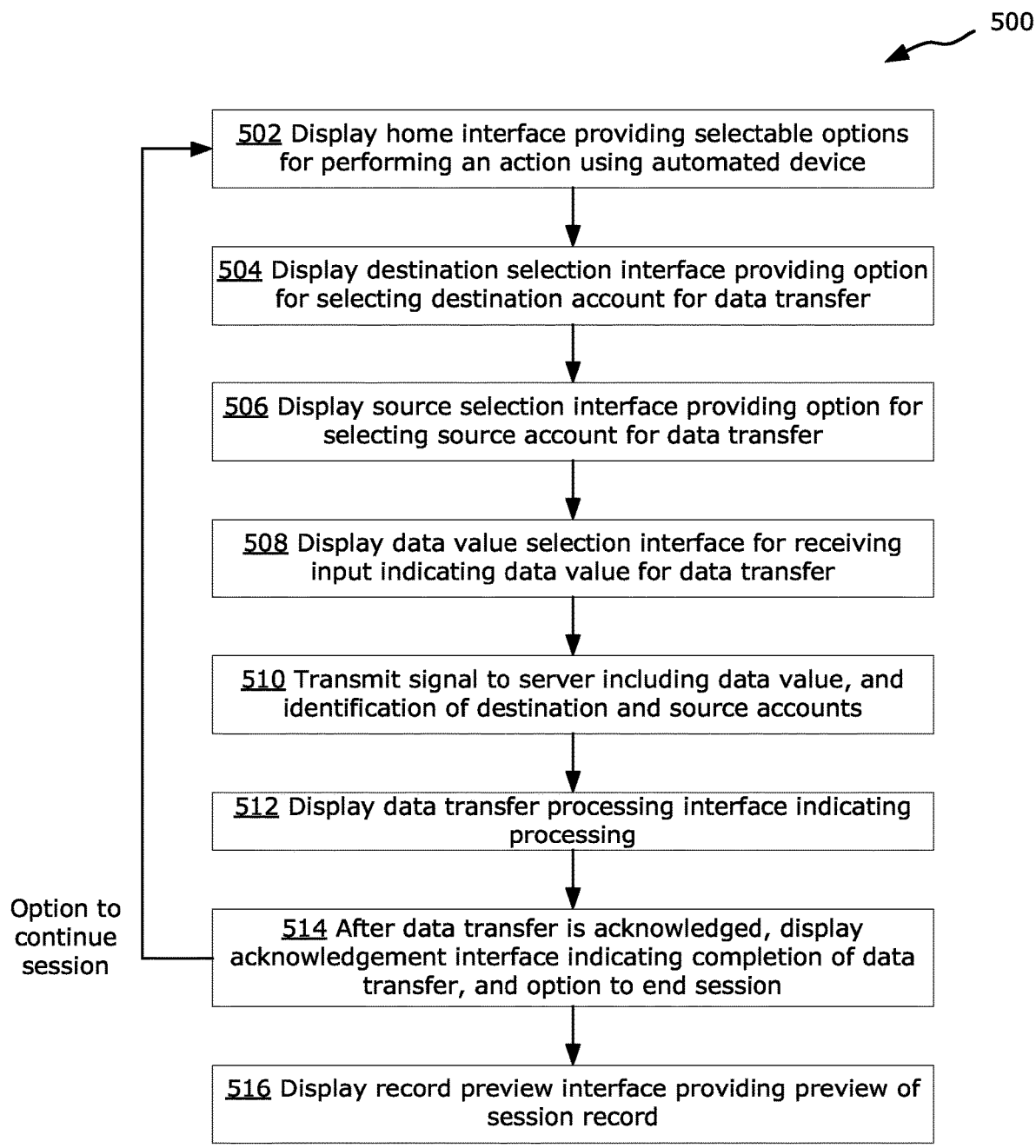
FIG. 5 is a flowchart illustrating an example method for performing a data transfer at an automated device.

FIG. 5 is a flowchart of an example method 500 for performing a data transfer at an automated device. The method 500 may follow the method 400 described above. The method 500 may be performed by the automated device 100 illustrated in FIG. 1, for example.

Figure 10A:
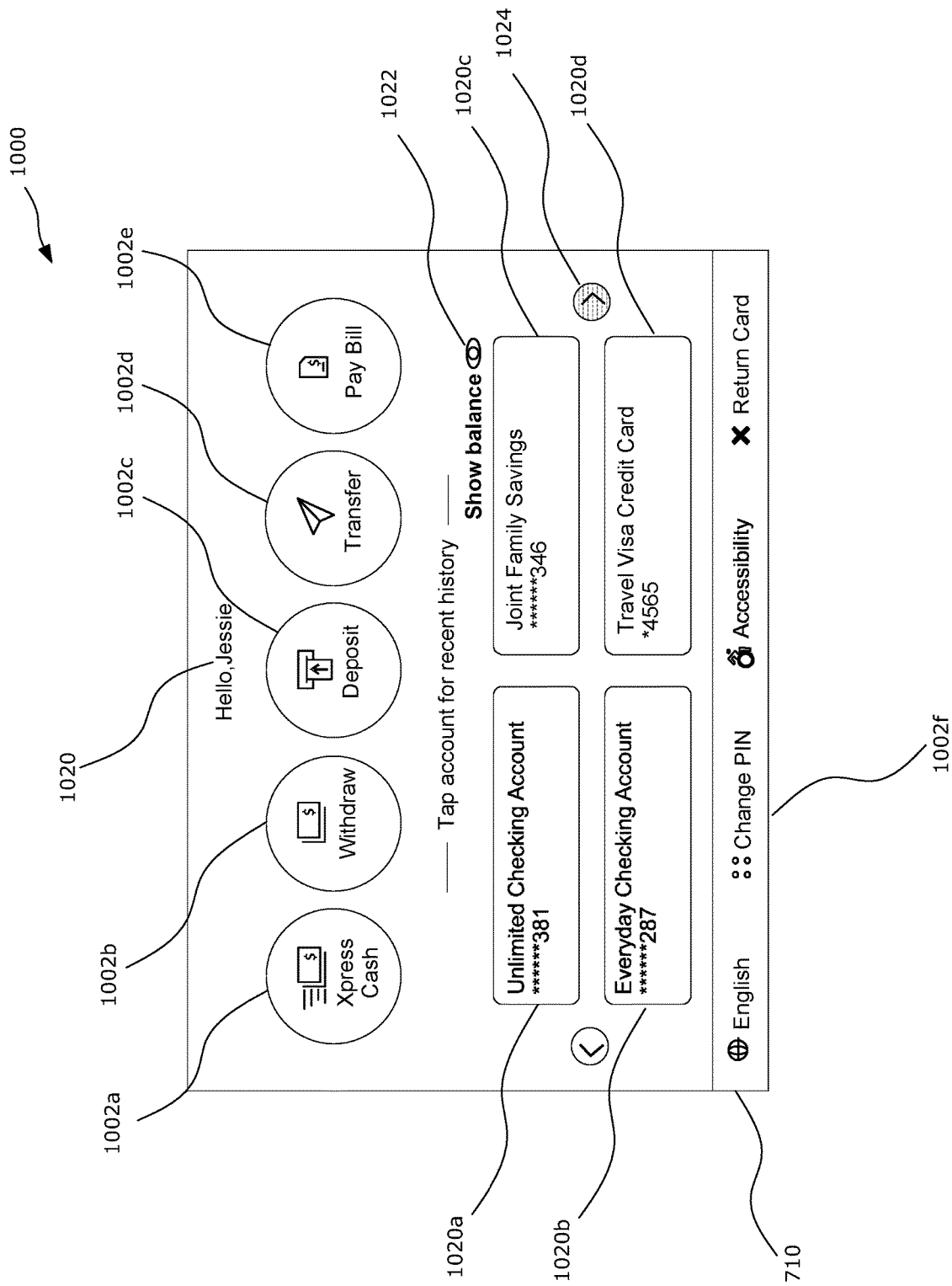
FIG. 10A is an example home interface that provides options for performing an action using the automated device.

At 502, the automated device displays the interface 1000 of FIG. 10A (also referred to as a home interface). The interface 1000 provides a plurality of selectable options as discussed below, each selectable option being selectable for example by interacting with a touchscreen and/or a keypad of the automated device. The interface 1000 provides a plurality of selectable options 1002a-1002f (generally referred to as selectable option 1002) for performing an action using the automated device. The action may be performed in the context of a selected account. The selected account may be selected from one or more accounts identified via an access card inserted into the automated device. The account may be a user account that is managed by the first party service provider (e.g., financial institution) that is associated with the automated device.

The options 1002 may be similar to the options 702 provided by the interface 700 of FIG. 7, and may include additional options 1002 not displayed in the interface 700. The selectable options 1002 involve exchanging or updating data contained in the account and managed by the service provider. One or more of the options 1002 may involve accepting physical input(s) and/or providing physical output(s), as part of the exchange of data. The selection options 1002 may also include one or more options for transferring data between accounts, including between two first party accounts managed by the same first party service provider, or between a first party account and a third-party account that is managed by a third-party service provider.

In this example, the selectable options 1002 include an option 1002a for providing express physical output (e.g., express withdrawal of cash), an option 1002b for providing physical output (e.g., regular withdrawal of cash), an option 1002c for providing physical input (e.g., a deposit of cash and/or check), an option 1002d for performing a transfer (e.g., of data or funds) between first party accounts, an option 1002e for performing a data transfer to a third-party account, and an option 1002f for changing an authentication code (e.g., a PIN) associated with the account. The interface 1000 also includes general options 710 as discussed above.

Optionally, the interface 1000 may also include a greeting 1020. In some examples, the greeting 1020 may include non-sensitive personalized information, such as a name associated with the user account. As discussed above, such customized information may be dynamically generated using information received from the server.

The interface 1000 also displays one or more selectable account options 1020a-1020d (generally referred to as account option 1020) for selecting an account that has been identified, for example via the inserted access card and via communications with the server as discussed above. There may be a plurality of accounts associated with the access card, each of which may be associated with different data and which may be used for performing different data exchange actions. Each account option 1020 may provide some identifying information about the account associated with the respective option, but the identifying information may be at least partially protected (e.g., using * symbols) to avoid sensitive information being inadvertently exposed. In this example, the account options 1020 include options 1020a and 1020b to select a checking account, an option 1020c to select a savings account, and an option 1020d to select a credit card account.

Each account option 1020 may be selectable in order to display further information (e.g., recent data history such as recent exchanges of data on that account) about the individual account associated with the selected option 1020 and/or to initiate an action for that individual account.

Figure 10B:
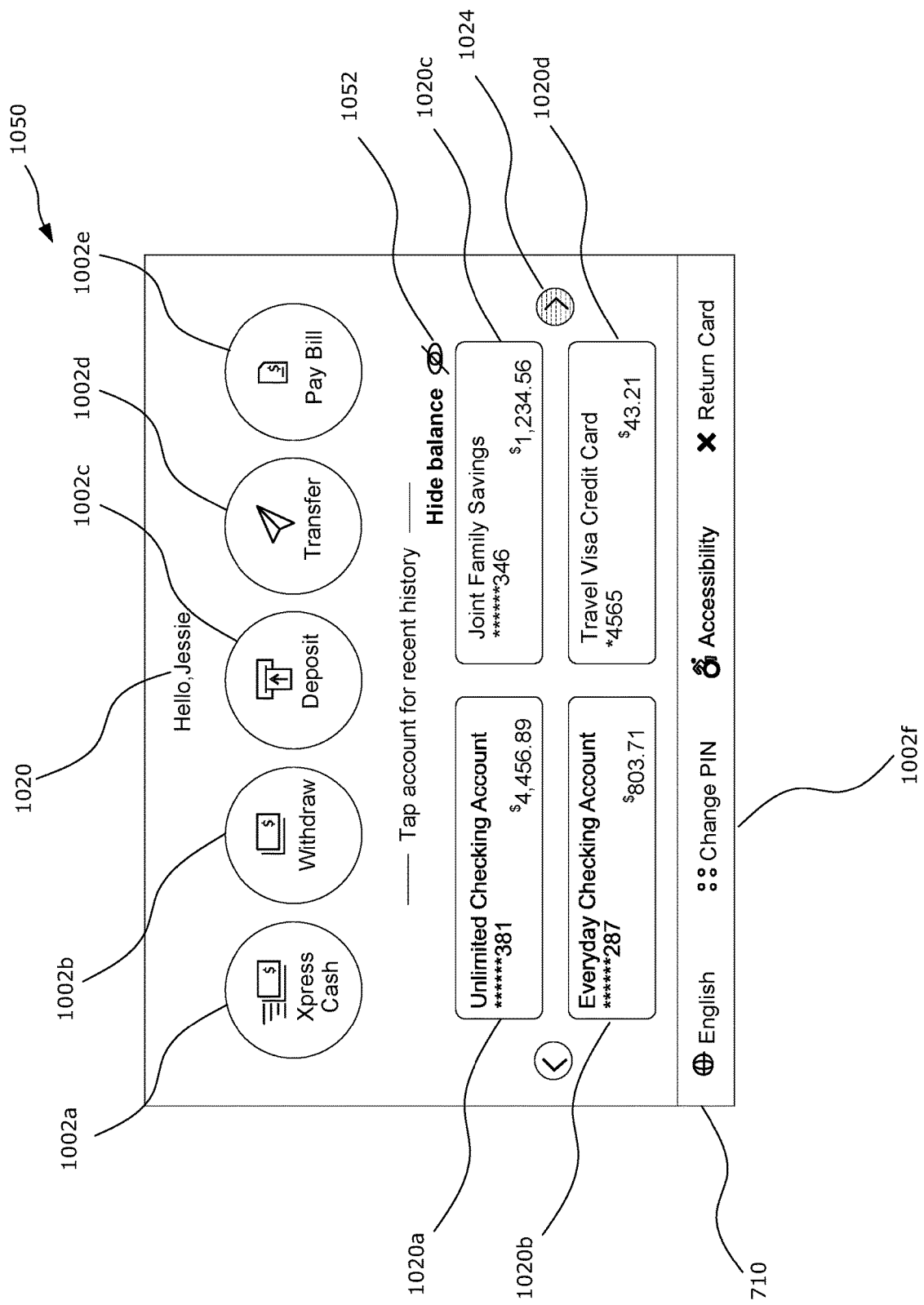
FIG. 10B is an example alternate home interface showing the current states of selectable accounts.

The interface 1000 also provides a selectable option 1022 to display further information about all the accounts associated with the displayed account options 1020. For example, the option 1022 may be selected to cause the account options 1020 to display the current state (e.g., current balance) of each associated account. The option 1022 in this example includes the message "Show balance" and a representative icon or other visual indicator to provide a visual cue. The further information may be received from the first party server. The information may be dynamically received, for example in response to a selection of the option 1022. In this way, the user may be provided with real-time, customized information. In this example, selecting the option 1022 causes the interface 1050 of FIG. 10B to be displayed (also referred to as an alternate home interface). The interface 1050 is similar to the interface 1000, and the two interfaces 1050, 1000 have common elements. The interface 1050 may be considered a sub-screen, a variation or a transition of the interface 1000. Thus, in some cases, the interface 1050 and the interface 1000 may be considered to be the same interface.

The interface 1050 provides further information about the accounts associated with the displayed account options 1020. For example, the automated device may query the server in order to obtain further information for the accounts, in order to dynamically generate the interface 1050. The automated device may transmit a signal to the server indicating the account(s) (e.g., including an identifier for the account(s)) for which further information is requested. In response, the server may transmit a signal to the automated device providing current information about the account(s), such as the current state (e.g., current balance) of the account(s). In this way, the automated device may dynamically generate the interface 1050 to provide current information about the selected account in real-time.

In the interface 1050, each account option 1020 is modified to include a visual indication of the current state of the respective associated account (e.g., shows the numerical current balance in each account), and the option 1022 is replaced by an option 1052 to hide the further information (e.g., current state of each account). The option 1052 in this example includes the message "Hide balance" and a representative icon or other visual indicator to provide a visual cue. Selection of options 1022 and 1052 may enable a user to toggle or switch between the interfaces 1000 and 1050. Generally, the options and functions available at the interface 1000 are the same at the interface 1050, with the exception of the options 1022 and 1052.

In cases where the number of accounts that have been identified for the access card exceed the number of displayable account options 1020, the user interface 1000 also provides scroll options 1024 to scroll to display of additional account options associated with additional accounts.

The information displayed for the options 1020 (e.g., identification of the associated accounts and, in the interface 1050, further information about the current state of each account) may be dynamically provided by the server. For example, the automated device may query the server in real-time (e.g., in response to selection of the option 1022) to obtain the account information to be displayed. The options 1020 may thus be customized in real-time, to provide information that is relevant to the current action and current session at the automated device.

Figure 11A:
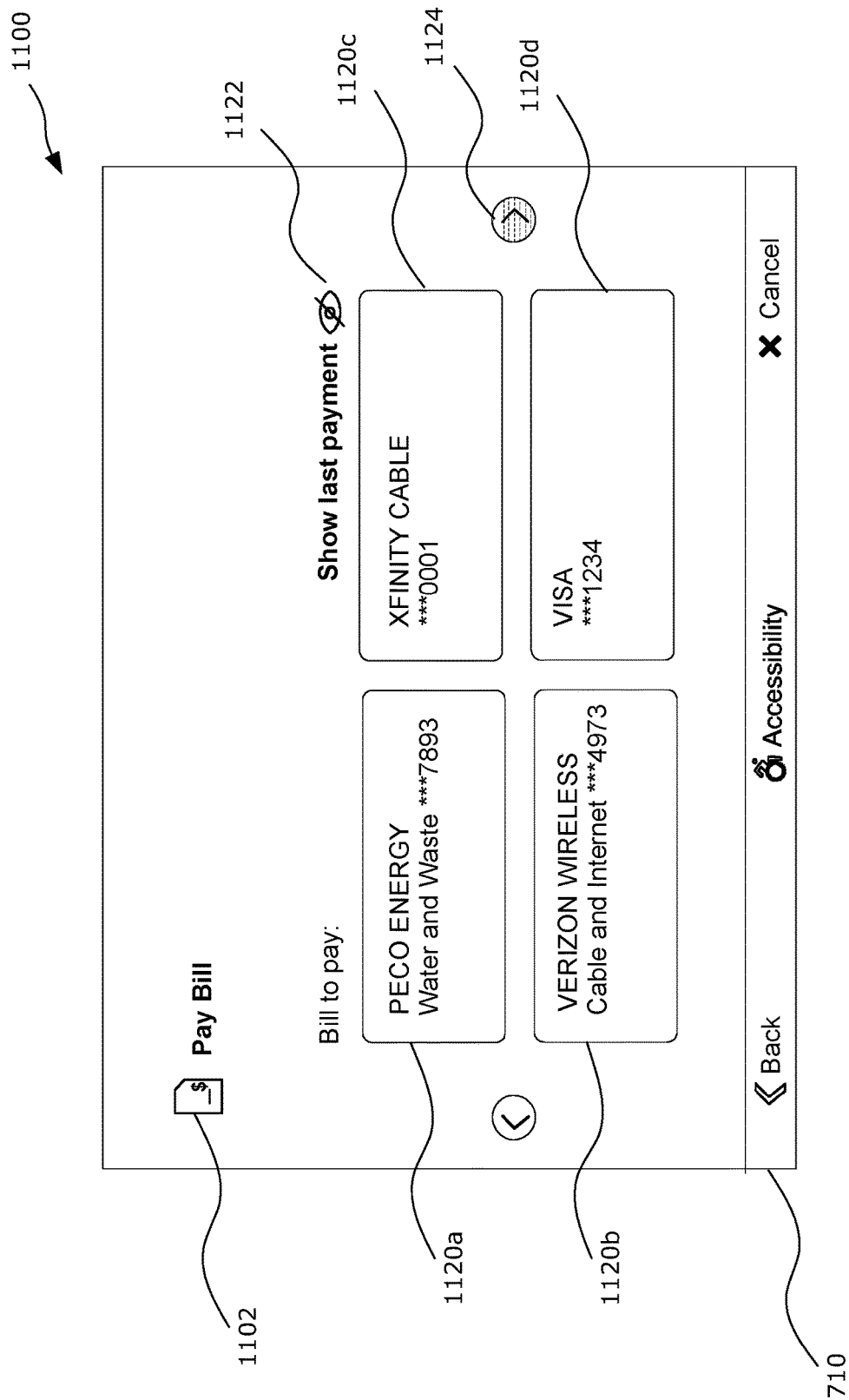
FIG. 11A is an example destination selection interface providing options for selecting a destination account for a data transfer.

Directly in response to selection of the option 1002e for performing a data transfer, the method 500 proceeds to 504 to display the interface 1100 of FIG. 11A (also referred to as a destination selection interface).

The interface 1100 includes a context indicator 1102 indicating that the interface 1100 is in the context of performing a data transfer, in accordance with the selection of the option 1002e in preceding interface 1000 or 1050. The interface 1100 provides one or more selectable options 1120a-1120d (generally referred to as options 1120) for selecting a destination account to receive the data transfer. The destination account may be a third-party account managed by a third-party service provider. The options 1120 may be populated with information about possible third-party destination accounts. Information about possible destination accounts may be received from the first party server. The information may be dynamically received from the first party server, so that the options 1120 may be populated with possible destination accounts in real-time and dependent on the user.

For example, a user profile stored at the first party server may include a list of destination accounts that are associated with the user account, as identified using the access card. The destination accounts that are associated with the user account may have been previously set by the user and/or automatically determined by the first party server (e.g., based on historical data transfers performed by the user). The information provided to the automated device may include an identification of the third-party service provider associated with a selectable destination account, as well as an account number associated with a selectable destination account.

Each option 1120 may provide some identifying information about the destination account associated with the respective option, but the identifying information may be at least partially protected (e.g., using * symbols) to avoid sensitive information being inadvertently exposed.

The interface 1100 also provides a selectable option 1122 to display further information about all the accounts associated with the displayed options 1120. For example, the option 1122 may be selected to display information about a historical data transfer (e.g., most recent data transfer, or last bill payment) for each associated destination account. The information about historical data transfers for each destination account may be received from the first party server. Such information may be received from the first party server together with the information identifying possible destination accounts, as discussed above. Alternatively, information about historical data transfers may be received from the first party server as needed, for example dynamically received from the first party server in response to selection of the option 1122. In this way, the automated device may dynamically generate the interface 1150 to provide further information about possible destination accounts.

Figure 11B:
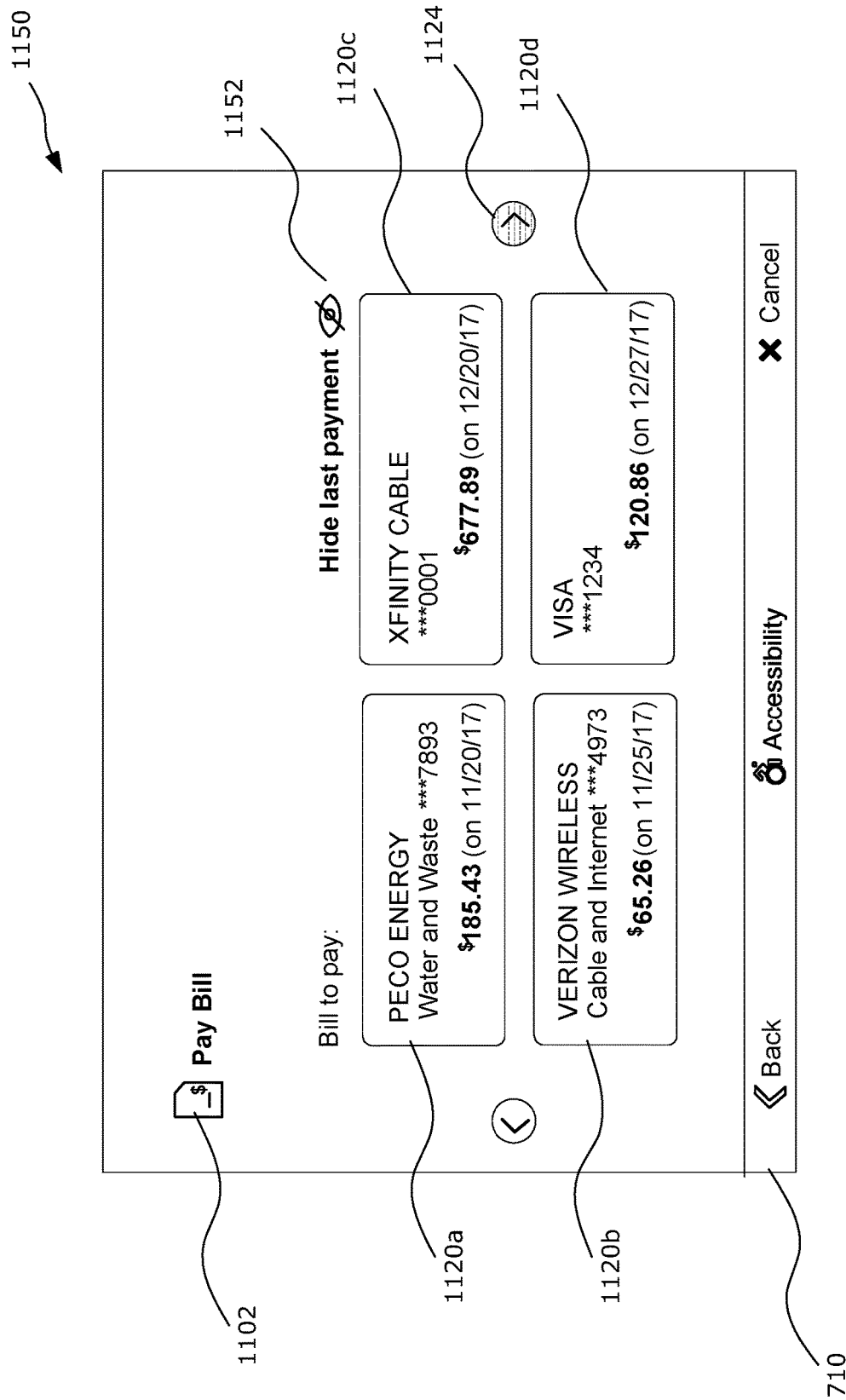
FIG. 11B is an example alternate destination selection interface showing information about historical data transfers.

In this example, selecting the option 1122 causes the interface 1150 of FIG. 11B (also referred to as an alternate destination selection interface) to be displayed. The interface 1150 is similar to the interface 1100, and the two interfaces 1150, 1100 have common elements. The interface 1150 may be considered a sub-screen, a variation or a transition of the interface 1100. Thus, in some cases, the interface 1150 and the interface 1100 may be considered to be the same interface. In the interface 1150, each destination account option 1120 is modified to include a visual indication of a historical data transfer. In the example shown, each option 1120 displays a data value and date for a most recent data transfer to each respective destination account. The option 1122 is replaced by an option 1152 to hide the further information. Selection of options 1122 and 1152 may enable a user to toggle or switch between the interfaces 1100 and 1150. Generally, the options and functions available at the interface 1100 are the same at the interface 1150, with the exception of the options 1122 and 1152.

In cases where the number of destination accounts that have been identified exceed the number of displayable options 1120, the interface 1100 also provides scroll options 1124 to scroll to display of additional account options associated with additional accounts. The interface 1100 also includes general options 710 as discussed above.

Figure 12A:
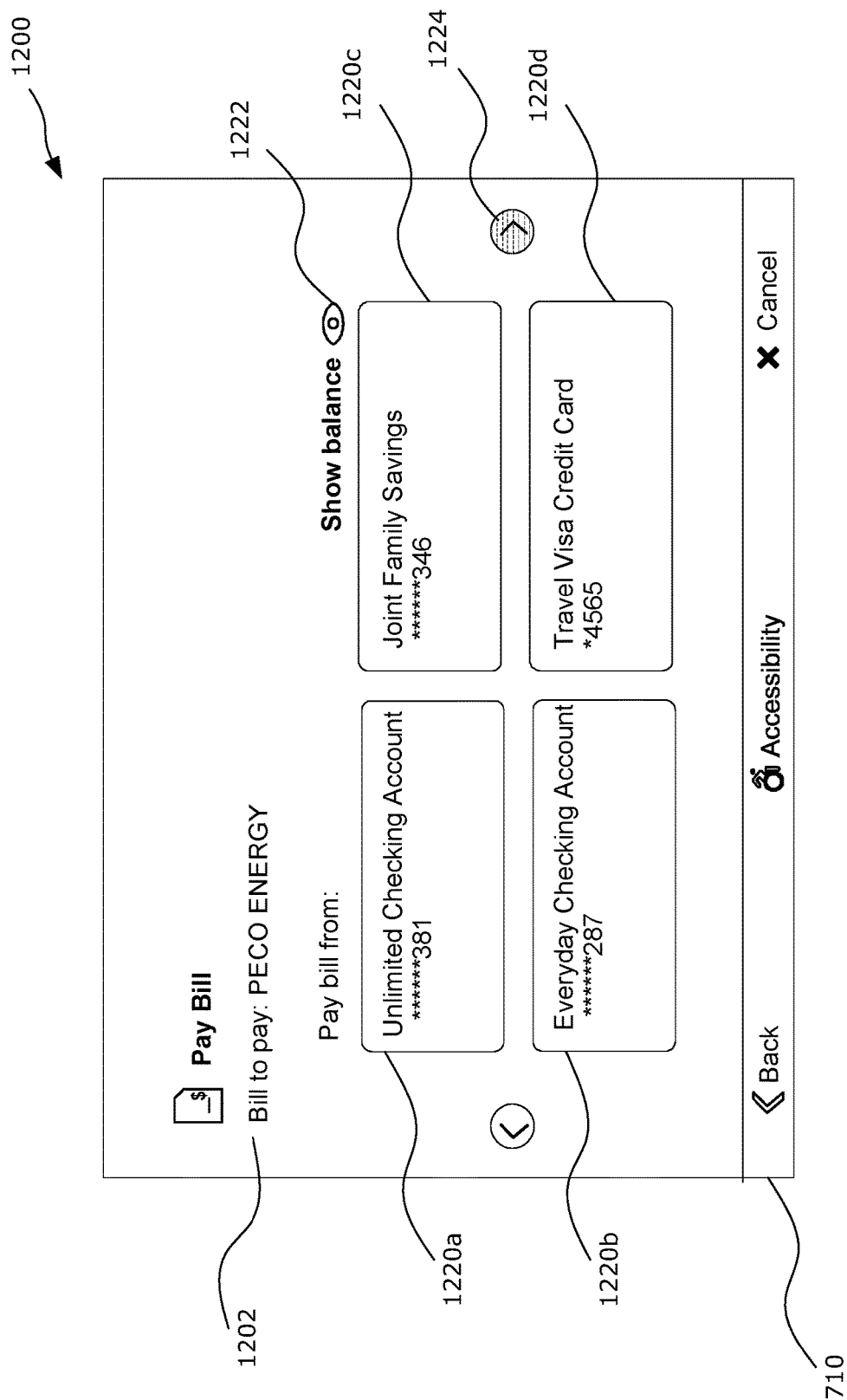
FIG. 12A is another example source selection interface that provides options for selecting a source account for a data transfer.

Directly in response to selection of a destination account, the method 500 proceeds to 506 to display the interface 1200 of FIG. 12A (also referred to as a source selection interface). The interface 1200 provides a selectable option for selecting a source account for the data transfer.

The interface 1200 includes a context indicator 1202 indicating that the selection of accounts is in the context of performing a data transfer, in accordance with the selection of the option 1002e in the earlier interface 1000 or 1050. The interface 1200 includes general options 706, as discussed above. Further, the context indicator 1202 is updated to indicate the destination account for the data transfer, in accordance with the selection received at the interface 1100 or 1150. The interface 1200 includes general options 710 as discussed above.

The interface 1200 displays one or more selectable options 1220a-1220d (generally referred to as account option 1220) to select a source account for the data transfer. The options 1220 are similar to the account options 1020 described above. The interface 1200 also provides a selectable option 1222 to display further information about all the accounts associated with the displayed account options 1220. For example, the option 1222 may be selected to cause the account options 1220 to display the current state (e.g., current balance) of each associated account.

Figure 12B:
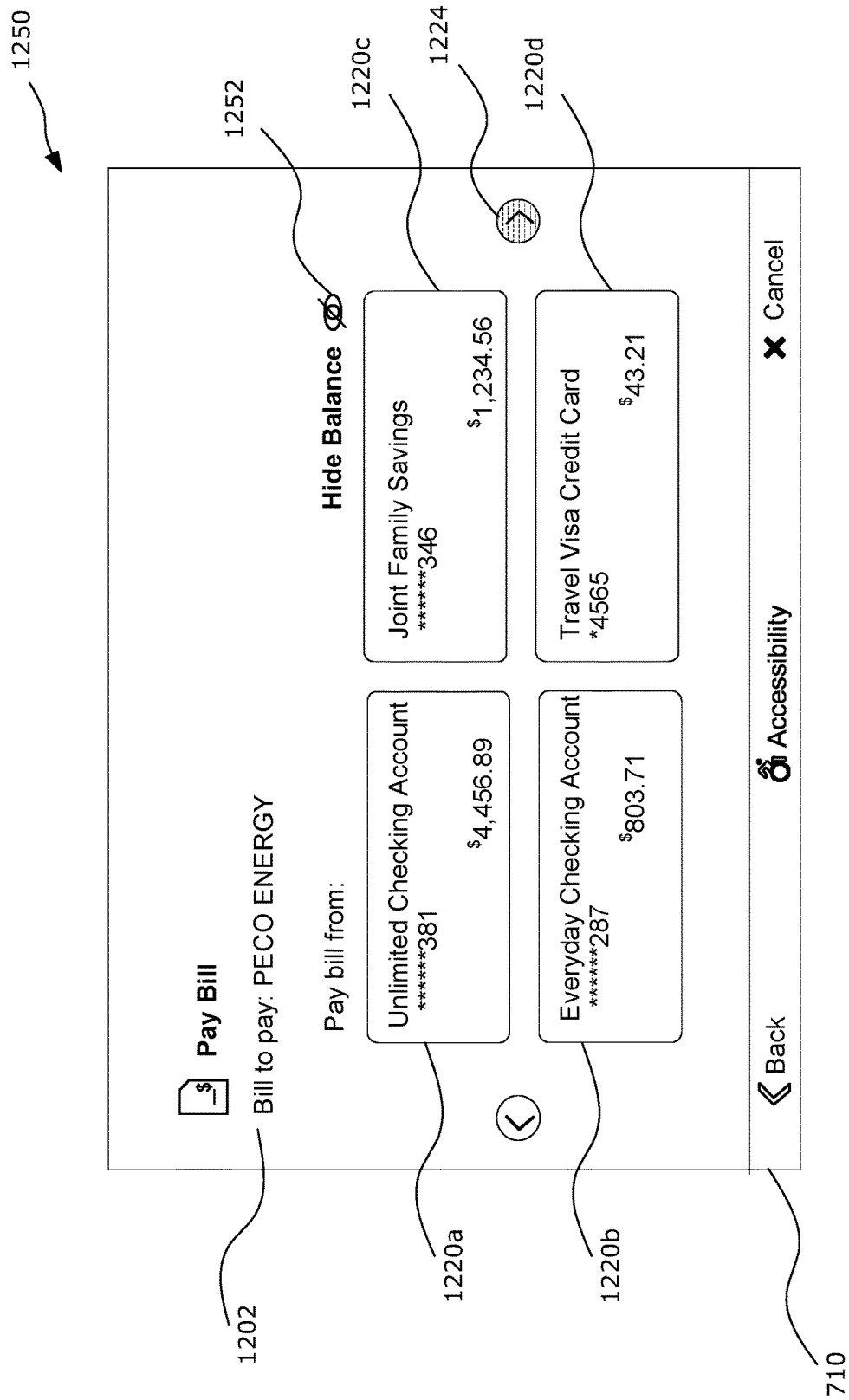
FIG. 12B is an example alternate source selection interface showing the current states of selectable accounts.

In this example, selecting the option 1222 causes the interface 1250 of FIG. 12B (also referred to as an alternate source selection interface) to be displayed. The interface 1250 is similar to the interface 1200, and the two interfaces 1250, 1200 have common elements. The interface 1250 may be considered a sub-screen, a variation or a transition of the interface 1200. Thus, in some cases, the interface 1250 and the interface 1200 may be considered to be the same interface. The interface 1250 may be dynamically generated using information received from the server, similar to the manner in which the interface 1050 may be dynamically generated, as discussed above. In this way, the automated device may dynamically generate the interface 1250 to provide current information about possible source accounts in real-time.

In the interface 1250, each account option 1220 is modified to include a visual indication of the current state of the respective associated account (e.g., shows the numerical current balance in each account), and the option 1222 is replaced by an option 1252 to hide the further information. Selection of options 1222 and 1252 may enable a user to toggle or switch between the interfaces 1200 and 1250. Generally, the options and functions available at the interface 1200 are the same at the interface 1250, with the exception of the options 1222 and 1252.

In cases where the number of accounts that have been identified for the access card exceed the number of displayable account options 1220, the user interface 1200 also provides scroll options 1224 to scroll to display of additional account options associated with additional accounts.

The account options 1220 may be dynamically populated with information received from the server, similarly to the account options 1020 as discussed above.

Figure 13:
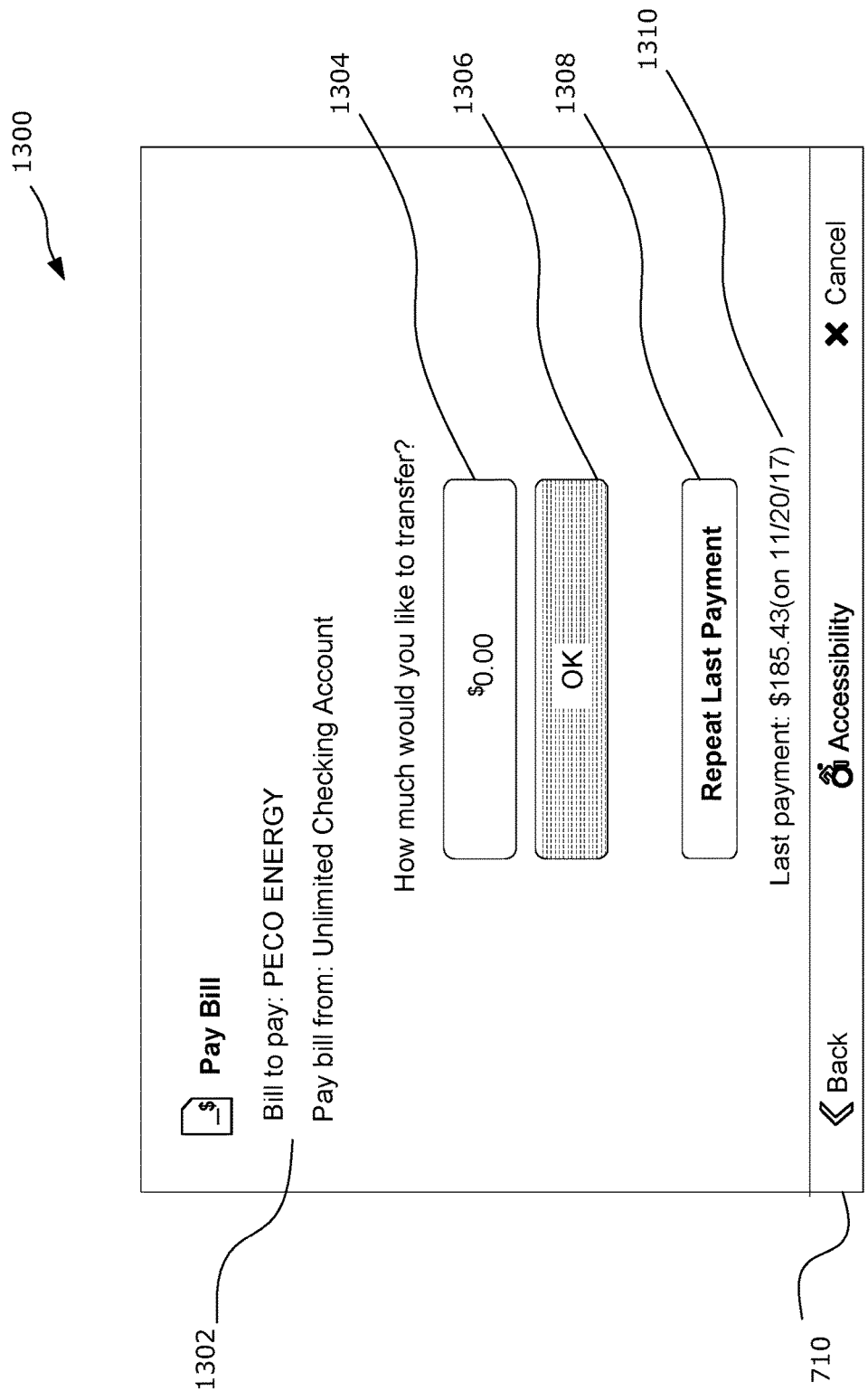
FIG. 13 is an example data value selection interface for receiving a data value for a data transfer.

Directly in response to selection of an option 1220 for the source account, the method 500 proceeds to 508, to display the interface 1300 of FIG. 13 (also referred to as a data value selection interface). The interface 1300 enables receipt of an input indicating a data value for the data transfer. The interface 1300 includes a context indicator 1302 indicating that the interface 1300 is in the context of performing a data transfer, in accordance with the selection of the option 1002e received at preceding interface 1000 or 1050 in the interface sequence. Further, the context indicator 1302 is updated to indicate the destination account and the source for the data transfer, in accordance with selections received at preceding interfaces 1100 or 1150, and 1200 or 1250 in the interface sequence. The interface 1300 includes general options 710 as discussed above.

The interface 1300 includes a field 1304 for entry of a data value for the data transfer. For example, a user may use the keypad of the automated device to provide input into the field 1304. The keypad may also provide the ability to backspace or cancel input. Other input mechanisms may also be used. The interface 1300 includes a confirmation button 1306 to confirm entry of the entered data value. The interface 1300 also includes an option 1308 to select a predetermined data value for the data transfer. In this example, the predetermined data value is a historical data value of a historical data transfer (e.g., data value of most recent data transfer) to the destination account. The interface 1300 also provides historical information 1310 about the historical data transfer, for example the data value and date of the historical data transfer. As discussed above, information about the historical data transfer may be received in real-time from the first party server, in order to populate the historical information 1310. Input may be received at the interface 1300 via entry of a data value into the field 1304 and selection of the confirmation button 1306, or via selection of the option 1308 for the predetermined data value.

When input is received via the interface 1300, the automated device at 510 transmits a signal to the first party server, for example using a communication module of the automated device, to provide the data value, and identification of the destination and source accounts. The first party server may be the server 306 of FIG. 3. In the context of FIG. 3, the automated device 100 may transmit a signal to the first party server 306 via the communication network 304.

The first party server may use the information provided by the automated device to initiate a data transfer between the first party source account managed by the first party server and the third-party destination account managed by a third-party server (e.g., the server 310 of FIG. 3). The first party server and third-party server may communicate with each other to, for example, authenticate the data transfer and reconcile data values between the destination and source accounts. In some examples, the communication and reconciliation between the first party server and the third-party server may take place at a set time, not necessarily in real-time. For example, the first party server may store data transfer information received from the automated device until the end of each day, and reconcile all data transfers in bulk at the end of each day.

The first party server may process the data transfer information from the automated device (e.g., to ensure that the information is valid) and send a signal back to the automated device acknowledging the data transfer.

Figure 14:
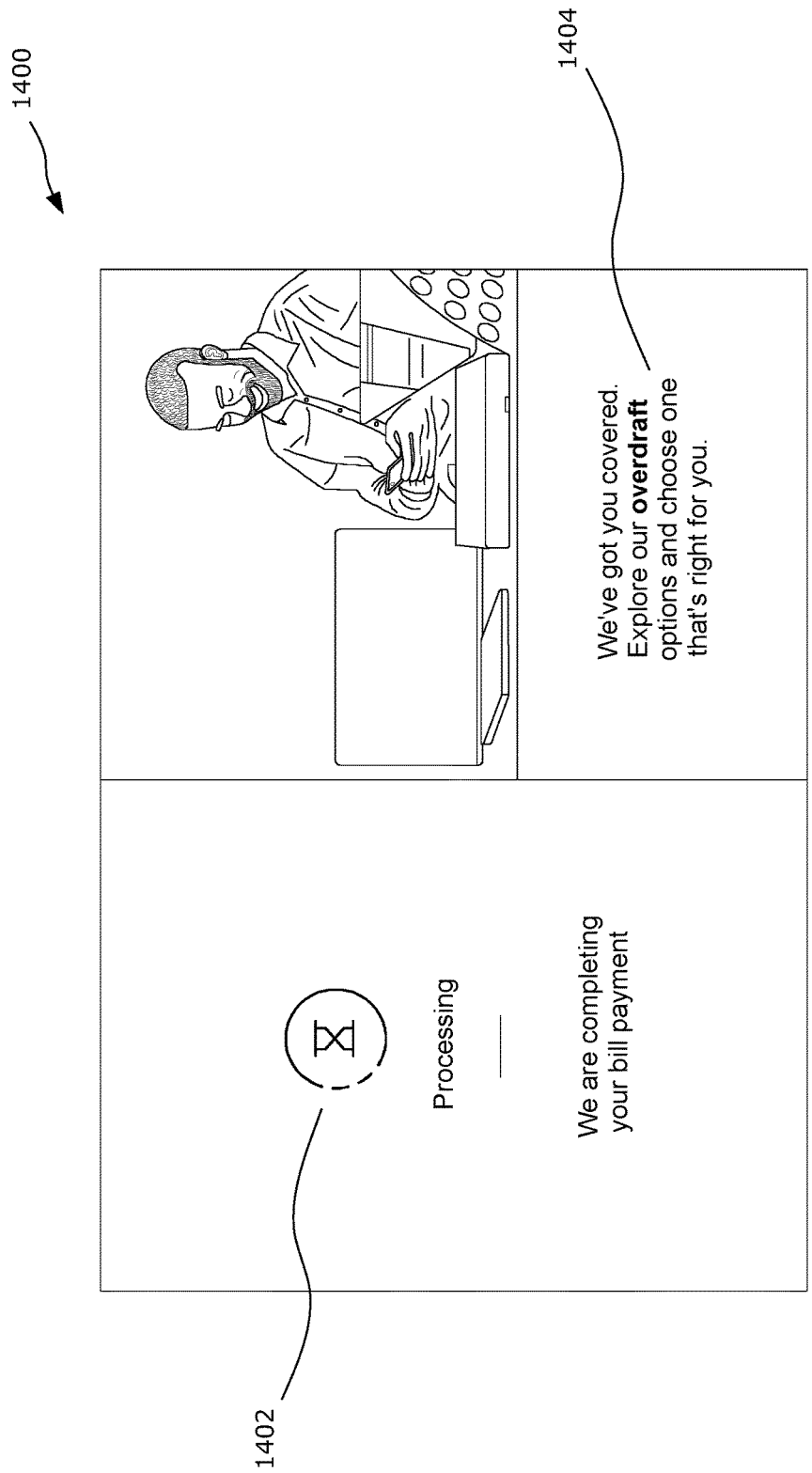
FIG. 14 is an example data transfer processing interface providing output indicating processing of a data transfer.

At 512, after transmitting the data transfer information to the first party server and before receiving the acknowledgement, the automated device may display the interface 1400 of FIG. 14 (also referred to as a data transfer processing interface). The interface 1400 may indicate processing of the data transfer. The interface 1400 may also be referred to as a processing screen or a wait screen. The interface 1400 may be omitted in other embodiments in which the processing or waiting time is negligible.

The interface 1400 in this example includes an animation 1402 to indicate processing. Other indicators, with or without animation, may be used. The user interface 1400 in this example also displays information 1404, which may or may not be similar to the information 904 that may be displayed at the interface 900 of FIG. 9.

Figure 15:
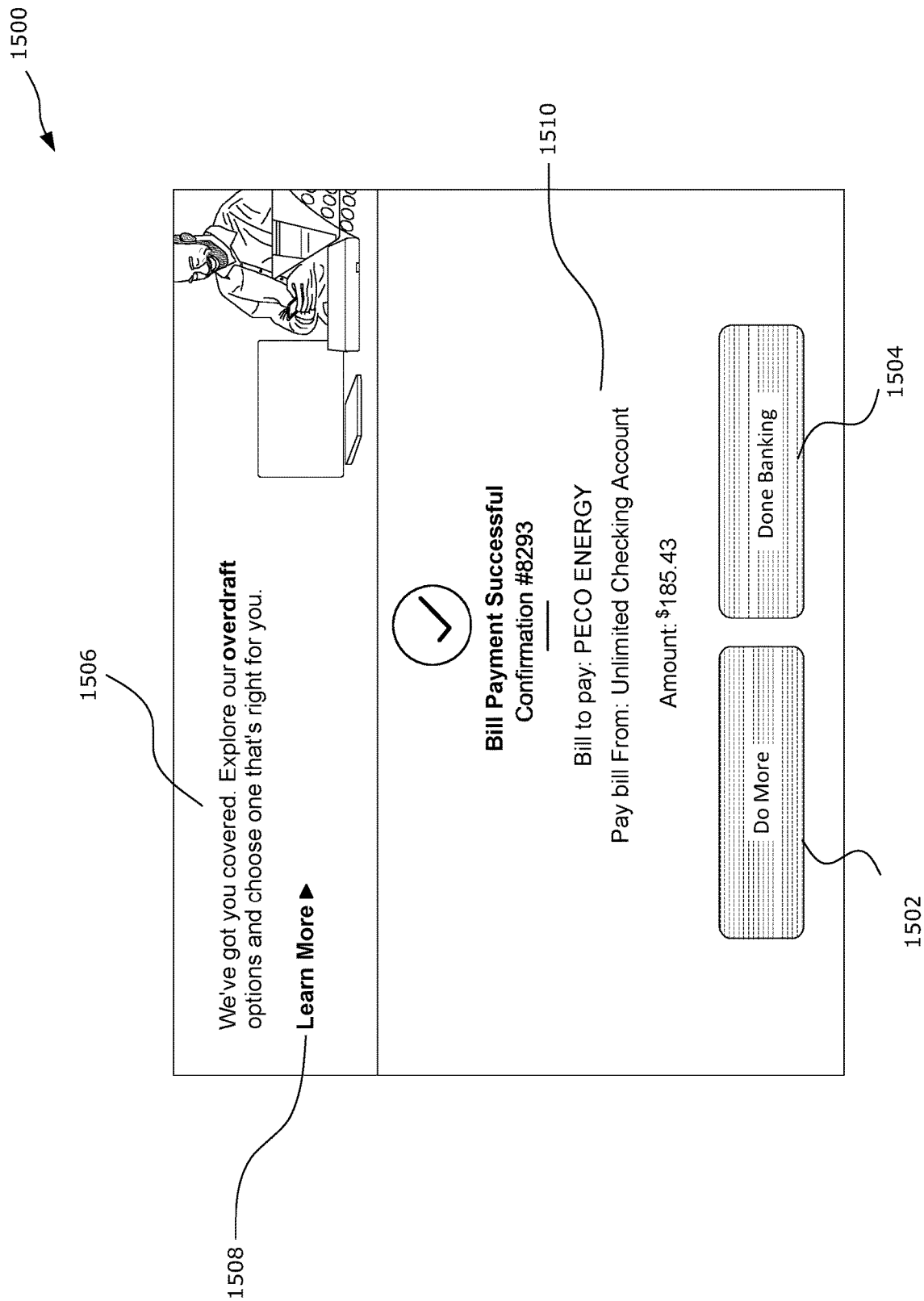
FIG. 15 is an example acknowledgement interface indicating completion of the data transfer.

In response to receipt of a signal from the first party server acknowledging the data transfer, at 514 the automated device displays the interface 1500 of FIG. 15 (also referred to as an acknowledgement interface). The interface 1500 indicates completion of the data transfer. It should be noted that the data transfer may actually be completed at a later time between the first party server and third-party server, as discussed above. The interface 1500 also provides a summary 1510 of the data transfer (e.g., showing the data value, destination account and source account for the data transfer). The summary 1510 may also include tracking data, such as a confirmation number, which may be used to track and/or confirm the data transfer. The tracking data may have been generated by the first party server and transmitted to the automated device together with or following the acknowledgement signal.

The interface 1500 provides an option 1502 to end the session and an option 1504 to continue the session. The interface 1500 may also include information 1506, which may be the same as, similar to, or different from the information 904 provided by the interface 900 of FIG. 9. The interface 1500 may also provide a selectable option 1508 to provide additional information further to the information 1506.

If the option 1502 is selected, the automated device may return to a previous interface or another interface to enable the session to continue. For example, the method 500 may return to 502 to display the interface 1000 of FIG. 10A.

Figure 16:
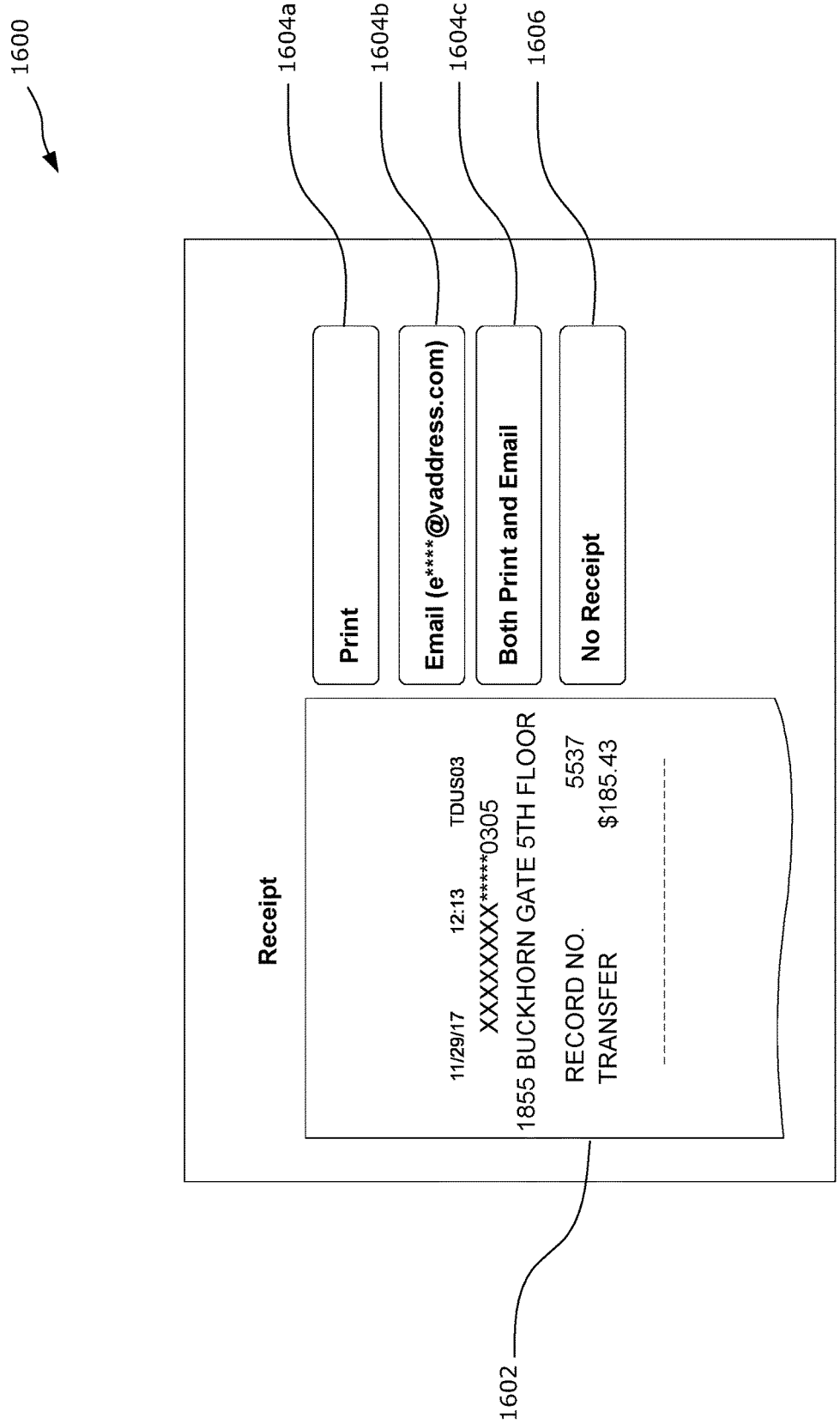
FIG. 16 is an example record preview interface for providing a preview of a record of the session and associated options.

At 516, directly in response to selection of the option 1504 to end the session, the automated device displays the interface 1600 of FIG. 16 (also referred to as a record preview interface). The interface 1600 provides a preview 1602 of a record of the session (e.g., in a visual form similar to a paper receipt). The record includes all data exchanges performed during the session. The interface 1600 also provides one or more options 1604a-1604c (generally referred to as options 1604) to generate output of the record. The options 1604 in this example include an option 1604a to generate a physical output (e.g., paper receipt) of the record, an option 1604b to generate a digital output (e.g., transmission of an email or other digital communication) of the record, and an option 1604c to generate both a physical and a digital output of the record. The interface 1600 also provides an option 1606 to not generate output of the record.

Where a digital output is selected, the digital output may be transmitted to an email address linked to the account. The email address may be predefined and associated with the account, thus avoiding the need for a user to manually input the email address and thereby facilitating a faster and more convenience interaction. For example, the automated device may receive a signal from the first party server providing the email address. The option 1604b to generate a digital output of the record can thus automatically include at least a preview of the email address. In this way, a user can be sure that the digital output of the record (which may include sensitive, personal information) is being sent to the correct email address. When the digital output is an email and the option 1604b to generate the digital output is selected, a digital version of the record is sent to the email address via the communication module 140. The email may be sent directly by the automated device (e.g., via an email client) or may be sent via the first party server. Where the email is sent via the first party server, the automated device may transmit a signal to the first party server via the communication module, the signal including information for generating the record, and the first party server in turn generates and transmits the email to the email address.

Figure 6:
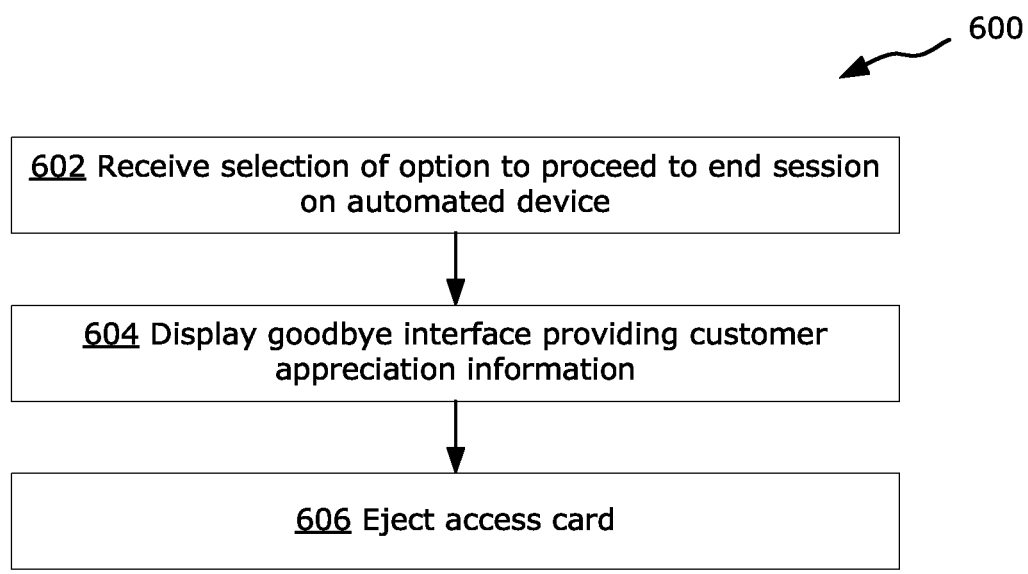
FIG. 6 is a flowchart illustrating an example method for ending a session at an automated device.

FIG. 6 is a flowchart of an example method 600 for ending a session on an automated device. The method 600 may follow the method 500 of FIG. 5. The method 600 may be performed by the automated device 100 illustrated in FIG. 1, for example.

At 602, the automated device receives selection of an option to proceed to end a current session on the automated device. For example, selection of any of the options 1604, 1606 provided by the interface 1600 of FIG. 16.

Figure 17:
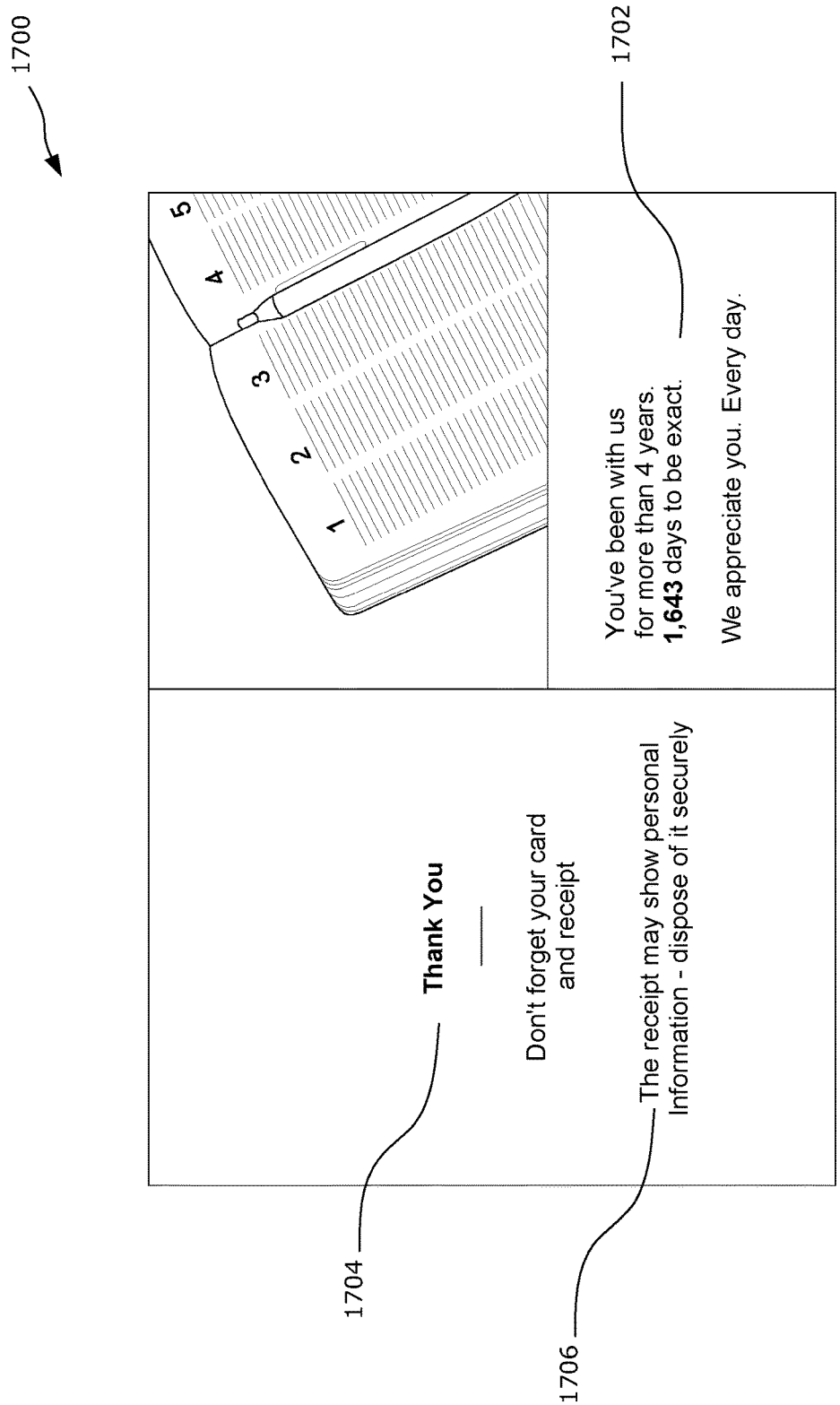
FIG. 17 is an example goodbye interface for providing customer appreciation information.

At 604, directly in response to the selection of any of the options listed above, the automated device displays the interface 1700 of FIG. 17 (also referred to as a goodbye interface). The interface 1700 provides customer appreciation information 1702. The customer appreciation information 1702 may include information specific to the account (e.g., number of days since the account was started with the service provider). The customer appreciation information 1702 may show only non-sensitive information. Certain information about the account may be requested by the automated device from the first party server, in order to dynamically generate account-specific customer appreciation information 1702. The interface 1700 may also include other information 1704, such as a general thank you message. Other types of information (e.g., similar to the information 904 provided by the interface 900 of FIG. 9) may be provided by the interface 1700. Where the option 1604a or 1604c was selected at the interface 1600 of FIG. 16, to generate a physical output of the session record, the interface 1700 may provide reminder information 1706 relevant to the physical output. Where a physical output was not selected, the reminder information 1706 may be omitted or may be modified to not refer to the physical output.

At 606, the inserted access card is ejected from the automated device. The access card may be ejected while the interface 1700 is being displayed. The interface 1700 may be displayed for a preset length of time (e.g., 5 seconds), or until the automated device detects that the access card has been removed.

Optionally, one or more of the user interfaces discussed above may include display of a background image (which may be the same or may differ between different user interfaces within a session). The background image may include animation for example. The background image may be different for different users, change depending on the season, change depending on the time of day, or have other such variations.

Optionally, one or more of the interfaces discussed above may also include branding, such as the logo of a service provider associated with the automated device.

In some examples, one or more processing or waiting screens may be skipped. For example, processing or waiting time may be negligible and the corresponding processing or waiting screen may not be displayed.

In the present disclosure, the automated device communicates with a server to exchange data which is used to dynamically populate one or more of the interfaces that are displayed by the automated device in a sequence of interfaces. The interfaces are presented in a sequence that provide an improved user experience with an automated device when performing actions related to exchange of data managed by a service provider. For example, the number of interfaces a user must navigate in order to complete an action may be reduced, by ordering the interfaces in a particular sequence. The interfaces also provide more streamlined and efficient interaction, by including contextual or summary information in the interfaces (e.g., visual cues, guidance or nudge) throughout the sequence without cluttering the interfaces with unnecessary information.

It should be appreciated that designing an effective user interface is not a process which is predictable or which lends itself to trial and error given the vast number of permutations that are possible. Factors affecting whether a user interface is effective include identifying efficient interactions which are relatively easy to perform, relatively easy to remember, have discoverability which allows users to discover functions during normal use without formal training, and which can be differentiated from other interactions by users and by the device relatively easily. Arbitrary or poorly considered user interfaces tend to create awkward and unnatural user experiences which make the required interaction harder to perform, harder to remember, undiscoverable (or at least less discoverable), and harder to differentiate from other interactions. Given the complex nature of human-machine interactions, effective user interfaces cannot be reliably predicted. This is known to the person of ordinary skill in the art of user interface design.

Studies performed with regard to examples of the disclosed sequence of interfaces have found increased user satisfaction with respect to interactions with the automated device across a variety of user groups.

In some examples, the sequence of interfaces may begin with an interface that displays options that are available at the automated device. The options that are displayed may depend on the account(s) associated with an inserted access card, may depend on the capabilities of the automated device and/or may depend on a current state of the automated device. In this way, a user is provided information about actions that may be performed using the automated device at the very start of the session, prior to entry of an authentication code. This may enable the session to skip displaying another interface that shows available options, and shorten the interface sequence. The user may also be able to determine from the start whether a desired action can or cannot be completed using the automated device.

In some examples, the sequence of interfaces may include interfaces that implicitly or explicitly confirm a selection made in a prior interface. For example, an interface may display contextual information that indicates the interface is part of an interface sequence used to perform a prior-selected action. An interface may also display contextual information to indicate that the action is being performed in the context of a particular prior-selected account.

In some examples, the automated device may provide an interface displaying a preview of a record of the session (e.g., a preview of a transaction receipt). The interface may also provide options for outputting the record, for example printing a physical copy of the record (e.g., using a printer peripheral of the automated device) and/or outputting a digital copy of the record to an email address associated with the account. The interface may exchange data with the backend server in order to retrieve the email address associated with the account (e.g., a primary email address in the case where there are multiple email addresses associated with the user account). In some cases, the interface may also display a preview of the email address (e.g., showing the first several characters of the email address), to assure the user the copy of the record is being sent to the correct email address. The interface may also provide an option to not generate an output of the record, for example the user may be satisfied after viewing the preview of the record on the interface.

In some examples, an interface may display information that is personalized or customized based on the user account. The customized information may be non-sensitive information (e.g., not related to financial data). The non-sensitive information may be a form of customer appreciation information. Such personalized information may be displayed without interfering with the sequence of interfaces required to perform an action. For example, such personalized information may be displayed at the beginning of a session, at the end of a session, or as part of an interface within the sequence. Displaying such non-sensitive, personalized information may help to convey a sense of appreciation, and help to engender user loyalty or goodwill towards the service provider. As an example, the number of days a user has been a customer of the service provider may be displayed at the end of a session. The interface may also display information may be used to inform the user of features and options provided by the automated device and/or service provider associated with the automated device. This may enable new features/options, useful features/options or rarely used features/options to be brought to the user's attention. The information may also provide general user appreciation information, marketing information, or other customized or non-customized information.

Although the present disclosure is described, at least in part, in terms of methods, a person of ordinary skill in the art will understand that the present disclosure is also directed to the various components for performing at least some of the aspects and features of the described methods, be it by way of hardware (digital signal processors (DSPs), application specific integrated circuits (ASICs), or field-programmable gate arrays (FPGAs)), software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device (e.g., a data manager) to execute examples of the methods disclosed herein.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising RAM memory, ROM memory, erasable programmable ROM (EPROM) memory, electrically EPROM (EEPROM) memory, and non-volatile RAM (NVRAM) memory. The above memory types are example only, and are thus not limiting as to the types of memory usable for storage of a computer program.

All values and sub-ranges within disclosed ranges are also disclosed. Also, although the systems, devices and processes disclosed and shown herein may comprise a specific plurality of elements/components, the systems, devices and assemblies may be modified to comprise additional or fewer of such elements/components. For example, although any of the elements/components disclosed may be referenced as being singular, the embodiments disclosed herein may be modified to comprise a plurality of such elements/components. The subject matter described herein intends to cover and embrace all suitable changes in technology.

The term "processor" may comprise any programmable system comprising systems using micro- or nano-processors/controllers, reduced instruction set circuits (RISC), ASICs, logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object-oriented databases, and any other structured collection of records or data that is stored in a computer system. The above examples are example only, and thus are not intended to limit in any way the definition and/or meaning of the terms "processor" or "database".

The present disclosure includes figures showing designs in the form of user interfaces in which at least some of the elements are shown with boundary lines illustrated as solid lines. The use of solid or dotted (broken) lines is not intended to be limiting for the purpose of design patent protection or industrial design protection. The designs of the present disclosure are not intended to be limited to the illustrated embodiments in which some design elements are shown in solid boundary lines and other design elements may be shown in dotted lines. It is contemplated that boundary lines that are depicted in the enclosed drawings as solid lines may be disclaimed and replaced with broken boundary lines in some embodiments for the purpose of design patent protection or industrial design protection, and vice versa.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method at an automated device, the method comprising:
    displaying a home interface providing a plurality of selectable options for performing an action using the automated device;
    directly in response to selection of an option to initiate a data transfer, displaying a destination selection interface providing a selectable option for selecting a destination account to receive the data transfer, the destination account being managed by a third-party service provider, the destination account being identified using information received from a first party server that is in communication with the automated device;
    directly in response to selection of the destination account, displaying a source selection interface providing a selectable option for selecting a source account for the data transfer;
    directly in response to selection of the source account, displaying a data value selection interface for receiving a first input indicating a data value for the data transfer;
    directly in response to receipt of the first input indicating the data value, transmitting, to the first party server the data value and information identifying the source account and the destination account;
    displaying a data transfer processing interface providing output indicating processing of the data transfer;
    directly in response to receipt, from the first party server acknowledgement of the data transfer, displaying an acknowledgement interface indicating completion of the data transfer, the acknowledgement interface further providing an option to end a session and an option to continue the session; and
    directly in response to selection of the option to end the session, displaying a record preview interface, the record preview interface providing a preview of a record of the session, the record preview interface further providing an option to generate output of the record.

2. The method of claim 1, wherein the option to generate output of the record includes an option to transmit the output of the record to an email address linked to the account, wherein the email address is received from the first party server, and wherein the option to transmit the output of the record to the email address includes a preview of the email address.

3. The method of claim 1, further comprising:
    directly in response to selection of an option on the record preview interface, displaying a goodbye interface, the goodbye interface providing non-sensitive customer appreciation information specific to the account.

4. The method of claim 1, wherein the destination selection interface, source selection interface and data value selection interface each includes a respective context indicator indicating that the destination selection interface, source selection interface and data value selection interface each is provided in the context of the data transfer, wherein the context indicator of the source selection interface further indicates the destination account for the data transfer, and wherein the context indicator of the data value selection interface further indicates the destination account and the source account for the data transfer.

5. The method of claim 1, further comprising:
    extracting information from an access card inserted into the automated device;
    transmitting, to the first party server, the information extracted from the access card;
    in response to receipt, from the first party server, information identifying at least the source account associated with the access card, displaying a welcome interface, the welcome interface providing at least some of the plurality of selectable options for performing an action using the automated device;
    directly in response to selection of one of the plurality of selectable options provided by the welcome interface, displaying an authentication interface for receiving an authentication code for the source account;
    transmitting, to the first party server, a second input received via the authentication interface;
    displaying an authentication waiting interface providing output indicating processing of the second input; and
    in response to receipt, from the first party server, an indication that the second input is validated for the source account, proceeding to display of the home interface.

6. The method of claim 1, wherein at least one of the home interface and the source selection interface provides an option to display a current status of the source account.

7. The method of claim 1, wherein the destination selection interface provides an option to display information about a historical data transfer to the destination account.

8. The method of claim 1, wherein the data value selection interface provides an option to select a predetermined data value for the data transfer, the predetermined data value being a historical data value of a historical data transfer to the destination account.

9. The method of 1, further comprising:
    directly in response to selection, on the acknowledgement interface, of the option to continue the session, displaying the home interface.

* * * * *